United States Patent
Chao et al.

(10) Patent No.: US 11,734,176 B2
(45) Date of Patent: Aug. 22, 2023

(54) SUB-NUMA CLUSTERING FAULT RESILIENT MEMORY SYSTEM

(71) Applicant: Dell Products L.P., Round Rock, TX (US)

(72) Inventors: Ching-Lung Chao, Austin, TX (US); Hsin-Chieh Wang, Taoyuan (TW); Hung-Tah Wei, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 51 days.

(21) Appl. No.: 17/512,325

(22) Filed: Oct. 27, 2021

(65) Prior Publication Data

US 2023/0130426 A1    Apr. 27, 2023

(51) Int. Cl.
| | |
|---|---|
| *G06F 12/0815* | (2016.01) |
| *G06F 12/02* | (2006.01) |
| *G06F 9/50* | (2006.01) |

(52) U.S. Cl.
CPC ........ *G06F 12/0815* (2013.01); *G06F 9/5016* (2013.01); *G06F 12/0284* (2013.01); *G06F 2212/1032* (2013.01)

(58) Field of Classification Search
None
See application file for complete search history.

(56) References Cited

U.S. PATENT DOCUMENTS

| 10,007,456 B1* | 6/2018 | Chinnakkonda Vidyapoornachary ..................... G06F 3/065 |
| 2011/0161726 A1* | 6/2011 | Swanson ............... G06F 11/076 714/6.12 |
| 2014/0006715 A1* | 1/2014 | Saraf ................... G06F 12/0692 711/129 |
| 2016/0070598 A1* | 3/2016 | Vadkerti ............... G06F 9/5077 718/104 |
| 2016/0162399 A1* | 6/2016 | Molloy ................ G11C 7/1075 711/105 |
| 2017/0185340 A1* | 6/2017 | Xie ....................... G06F 3/0604 |
| 2021/0157647 A1* | 5/2021 | Wen .................... G06F 11/3037 |

* cited by examiner

*Primary Examiner* — Kaushikkumar M Patel
(74) *Attorney, Agent, or Firm* — Joseph Mencher

(57) ABSTRACT

A sub-Non-Uniform Memory Access (sub-NUMA) clustering fault resilient memory system includes an initialization subsystem that is coupled to a processing system and a memory system. The initialization subsystem determines that the processing system and the memory system are configured to provide a plurality of NUMA nodes, allocates a respective portion of the memory system to each of the plurality of NUMA nodes, and configures each respective portion of the memory system to mirror a mirrored subset of that respective portion of the memory system. Subsequently, respective data that is utilized by each of the plurality of NUMA nodes provided by the processing system and the memory system and that is stored in the mirrored subset of the respective portion of the memory system allocated to that NUMA node is mirrored in that respective portion of the memory system.

20 Claims, 12 Drawing Sheets

SUB-NUMA CLUSTERING FAULT RESILIENT MEMORY SYSTEM

BACKGROUND

The present disclosure relates generally to information handling systems, and more particularly to providing fault resilient memory for sub-NUMA clusters in information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices, may utilize data protection subsystems such as Fault Resilient Memory (FRM) subsystems available in server devices provided by DELL® Inc. of Round Rock, Tex., United States. Such data protection subsystems operate to protect data in memory systems from uncorrectable memory errors by mirroring data stored in a first portion of the memory system in a second portion of the memory system for use in the event the data stored in the first portion of the memory system experiences an uncorrectable memory error. For example, the FRM memory subsystems discussed above may leverage Address-Range-Based Mirroring (ARBM) from INTEL® corporation of Santa Clara, Calif., United States, and in response to an uncorrectable memory error may access the mirror copy of the first portion of the memory system that is stored in the second portion of the memory system in order to retrieve the data stored therein. The data protection subsystems discussed above are often utilized to protect operating system kernel data that, if subject to an uncorrectable memory error, will cause the operating system kernel to fail. However, the use of such data protection subsystems with particular processing system architectures has been found to raise some issues.

For example, some server devices implement a Non-Uniform Memory Access (NUMA) processing system architecture, which one of skill in the art will recognize is supported by many modern operating systems and provides a computer memory design for multiprocessing where memory access times depend on the memory location relative to the processor. For example, NUMA systems may include NUMA nodes each provided by a respective processor and memory, with a processor providing a NUMA node accessing its local memory in that NUMA node faster than non-local memory in other NUMA nodes (or non-local memory that is shared between processors providing different NUMA nodes), and tend to provide benefits for workloads on server devices that include data that is relatively strongly associated with particular tasks or users. Such NUMA nodes utilize operating system kernel data in their operation, and thus it is desirable to protect that operating kernel data using the data protection subsystems discussed above.

However, the NUMA systems discussed above may also be configured to perform Sub-NUMA Clustering (SNC), which allows each processor in the server device to provide multiple NUMA nodes (e.g., a Central Processing Unit (CPU) may provide 2 NUMA nodes, 4 NUMA nodes, etc.). However, it has been found that when SNC is enabled in a NUMA system, data protection subsystems may not mirror the respective operating system kernel data utilized by each of the NUMA nodes provided by a processor. For example, in systems using FRM with ARBM as discussed above, the ARBM functionality may not mirror operating system kernel data for one or more of the NUMA nodes provided by a processor, which allows an uncorrectable memory error that may occur when reading that operating system kernel data to cause the operating system kernel for that NUMA node to fail (i.e., because there is no mirror/copy of that operating system kernel data available).

Accordingly, it would be desirable to provide a sub-NUMA clustering fault resilient memory system that addresses the issues discussed above.

SUMMARY

According to one embodiment, an Information Handling System (IHS) includes an initialization processing system; and an initialization memory system that is coupled to the initialization processing system and that includes instructions that, when executed by the initialization processing system, cause the initialization processing system to provide an initialization engine that is configured to: determine that a Non-Uniform Memory Access (NUMA) processing system and a NUMA memory system are configured to provide a plurality of NUMA nodes; allocate a respective portion of the NUMA memory system to each of the plurality of NUMA nodes; and configure each respective portion of the NUMA memory system to mirror a mirrored subset of that respective portion of the NUMA memory system such that data that is utilized by each of the plurality of NUMA nodes provided by the NUMA processing system and the NUMA memory system and that is stored in the mirrored subset of the respective portion of the NUMA memory system allocated to that NUMA node is mirrored in that respective portion of the NUMA memory system.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
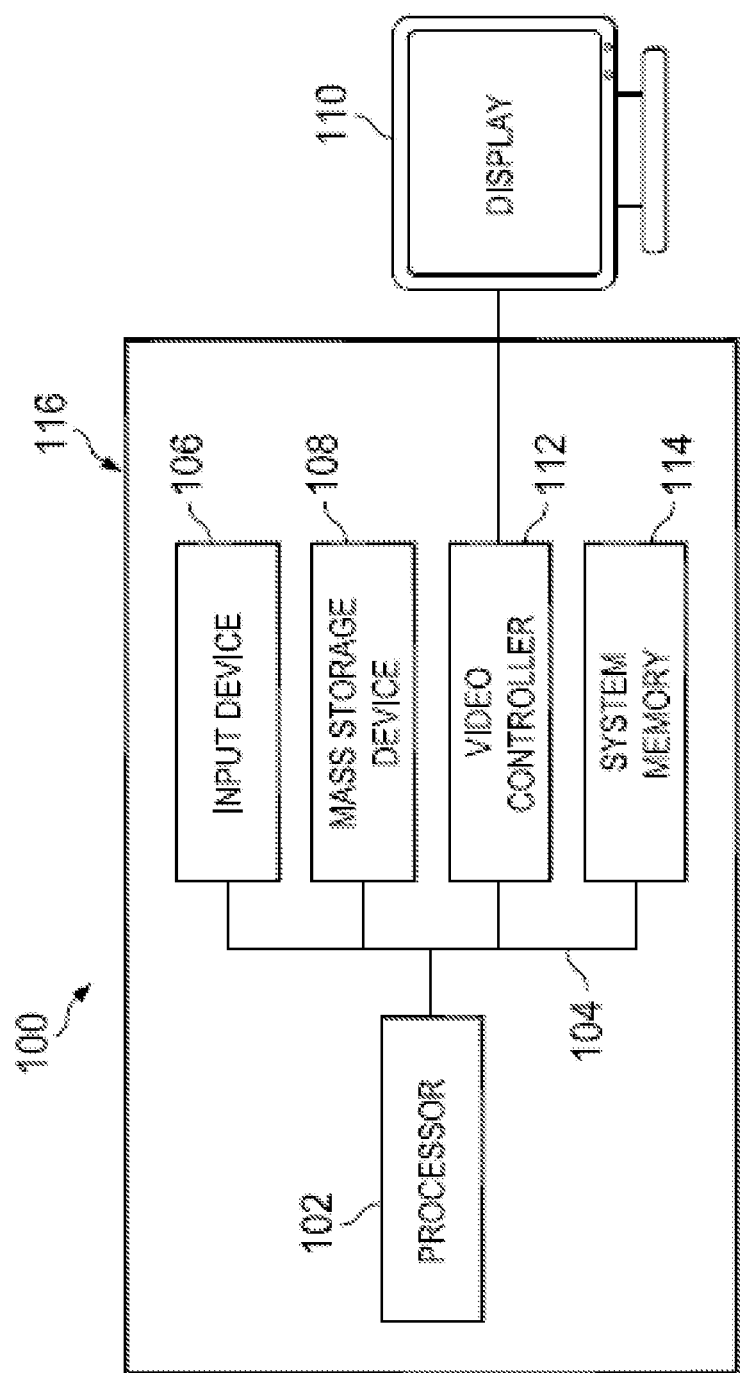
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
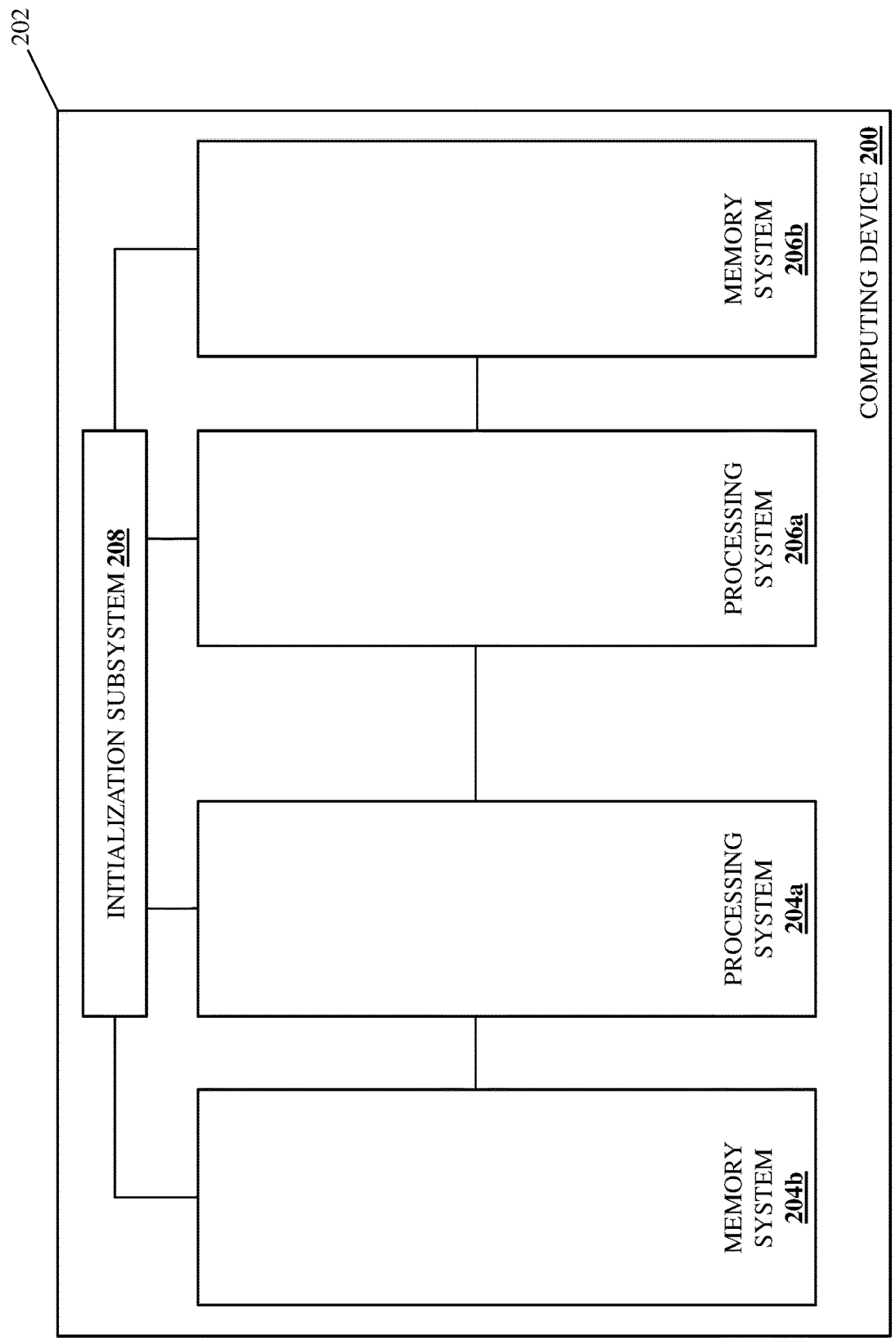
FIG. 2 is a schematic view illustrating an embodiment of a computing device that may include the sub-NUMA clustering fault resilient memory system of the present disclosure.

Referring now to FIG. 2, an embodiment of a computing device 200 is illustrated that may provide the sub-Non-Uniform Memory Access (sub-NUMA) clustering fault resilient memory system of the present disclosure, but that is also described below as functioning conventionally in order to illustrate and discuss the benefits of the sub-NUMA clustering fault resilient memory system of the present disclosure. In an embodiment, the computing device 200 may be provided by the IHS 100 discussed above with reference to FIG. 1 and/or may include some or all of the components of the IHS 100, and in specific examples may be provided by a server device. However, while illustrated and discussed as being provided by a server device, one of skill in the art in possession of the present disclosure will recognize that the functionality of the computing device 200 discussed below may be provided by other devices that are configured to operate similarly as the computing device 200 discussed below.

In the illustrated embodiment, the computing device 200 includes a chassis 202 that houses the components of the computing device 200, only some of which are illustrated and discussed below. In the specific examples illustrated and described herein, the chassis 202 houses a first processing system 204a (e.g., which may include the processor 102 discussed above with reference to FIG. 1, and which may be referred to below as a NUMA processing system) and a first memory system 204b (e.g., which may include the memory 114 discussed above with reference to FIG. 1, and which may be referred to below as a NUMA memory system) that is coupled to the first processing system 204a, with the first processing system 204a and the first memory system 204b configured to provide one or more NUMA nodes as discussed below.

In the specific examples illustrated and described herein, the chassis 202 also houses a second processing system 206a (e.g., which may include the processor 102 discussed above with reference to FIG. 1, and which may be referred to below as a NUMA processing system) and a second memory system 206b (e.g., which may include the memory 114 discussed above with reference to FIG. 1, and which may be referred to below as a NUMA memory system) that is coupled to the second processing system 206a, with the second processing system 206a and the second memory system 206b configured to provide one or more NUMA nodes as discussed below. As illustrated, the first processing system 204a and the second processing system 206a may be coupled together, which one of skill in the art in possession of the present disclosure will recognize may enable any of a variety of inter-processing-system NUMA operations known in the art.

However, while a "two-physical-NUMA-node" system is illustrated and described in the specific examples provided herein, one of skill in the art in possession of the present disclosure will appreciate how conventional NUMA systems may include four "physical" NUMA nodes that may be provided by a first processing system/memory system combination, a second processing system/memory system combination, a third processing system/memory system combination, and a fourth processing system/memory system combination, and that such "four-physical-NUMA-node" systems will benefit from the teachings of the present disclosure and thus will fall within its scope as well. Furthermore, future NUMA systems with more than four physical NUMA nodes are also envisioned as falling within the scope of the present disclosure.

In the illustrated embodiment, the chassis 202 also houses an initialization subsystem 208 that is coupled to each of the processing system 204a, the memory system 204b, the processing system 206a, and the memory system 206b. In a specific example, the initialization subsystem 208 may be provided by a Basic Input/Output System (BIOS) and/or Uniform Extensible Firmware Interface (UEFI) system that one of skill in the art in possession of the present disclosure will recognize operates to perform initialization operations for the computing device 200 during its startup, boot, or other initialization, as well as a variety of BIOS/UEFI runtime operations known in the art. For example, the initialization subsystem 208 may include an initialization processing system (e.g., a BIOS/UEFI processing system) and an initialization memory system (e.g., BIOS/UEFI memory system) that includes instructions that, when executed by the initialization processing system, cause the initialization processing system to perform the functionality of the initialization engines and initialization subsystems discussed below. However, while a specific computing device 200 has been illustrated and described, one of skill in the art in possession of the present disclosure will recognize that computing devices (or other devices operating according to the teachings of the present disclosure in a manner similar to that described below for the computing device 200) may include a variety of components and/or component configurations for providing conventional computing device functionality, as well as the functionality discussed below, while remaining within the scope of the present disclosure as well.

Figure 3:
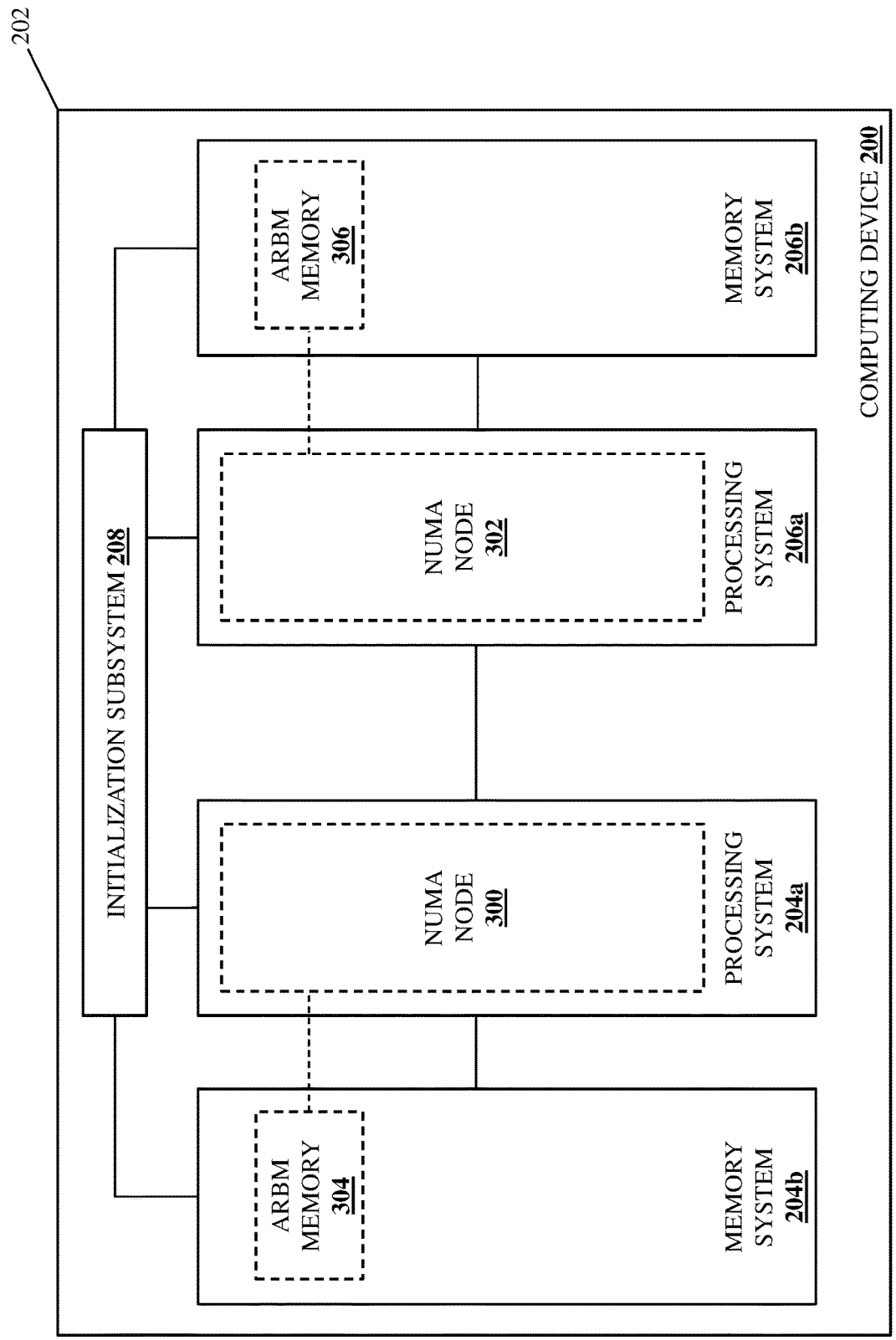
FIG. 3 is a schematic view illustrating an embodiment of the computing device of FIG. 2 performing conventional NUMA node fault resilient memory operations.
Figure 4:
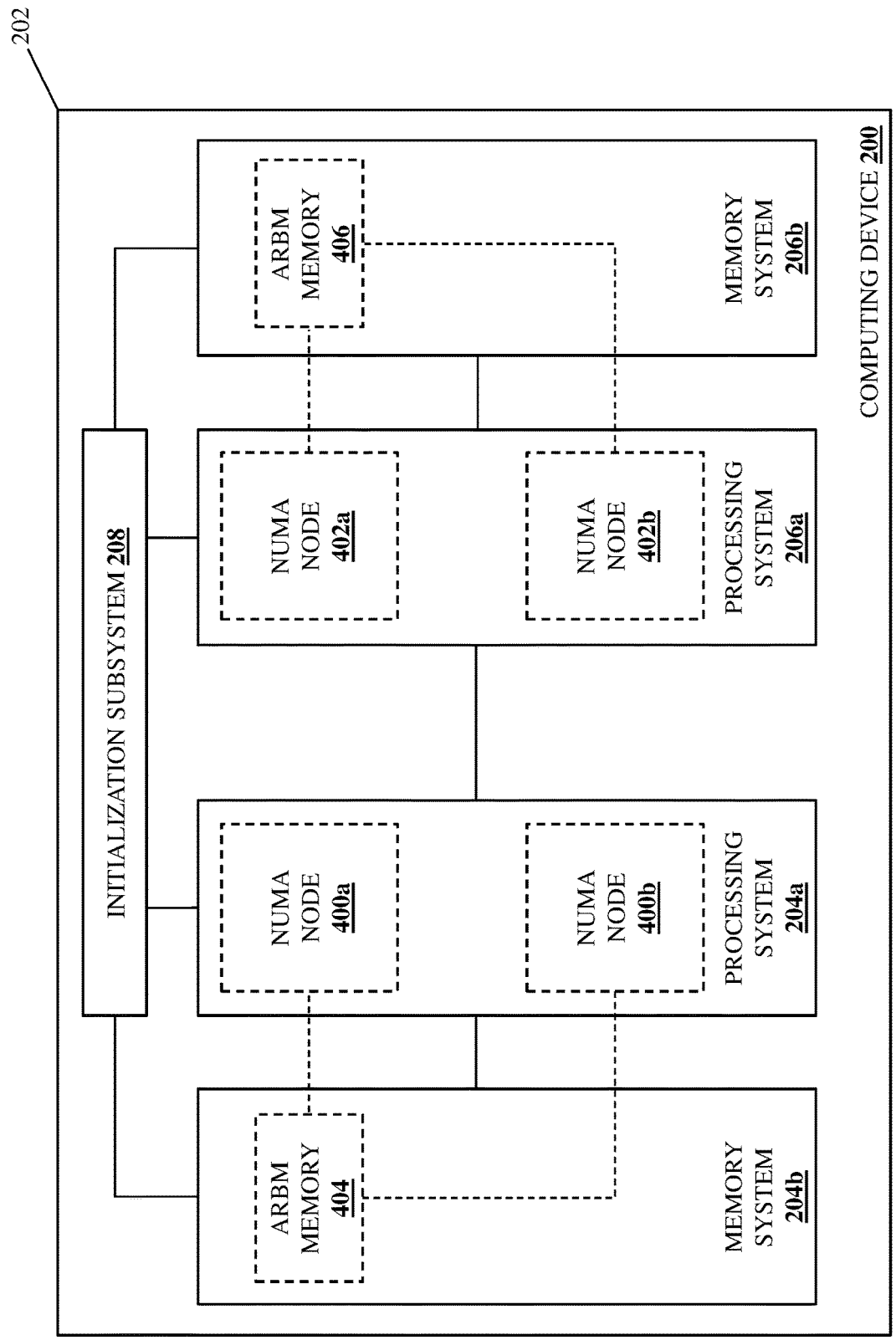
FIG. 4 is a schematic view illustrating an embodiment of the computing device of FIG. 2 performing conventional sub-NUMA clustering fault resilient memory operations.
Figure 5:
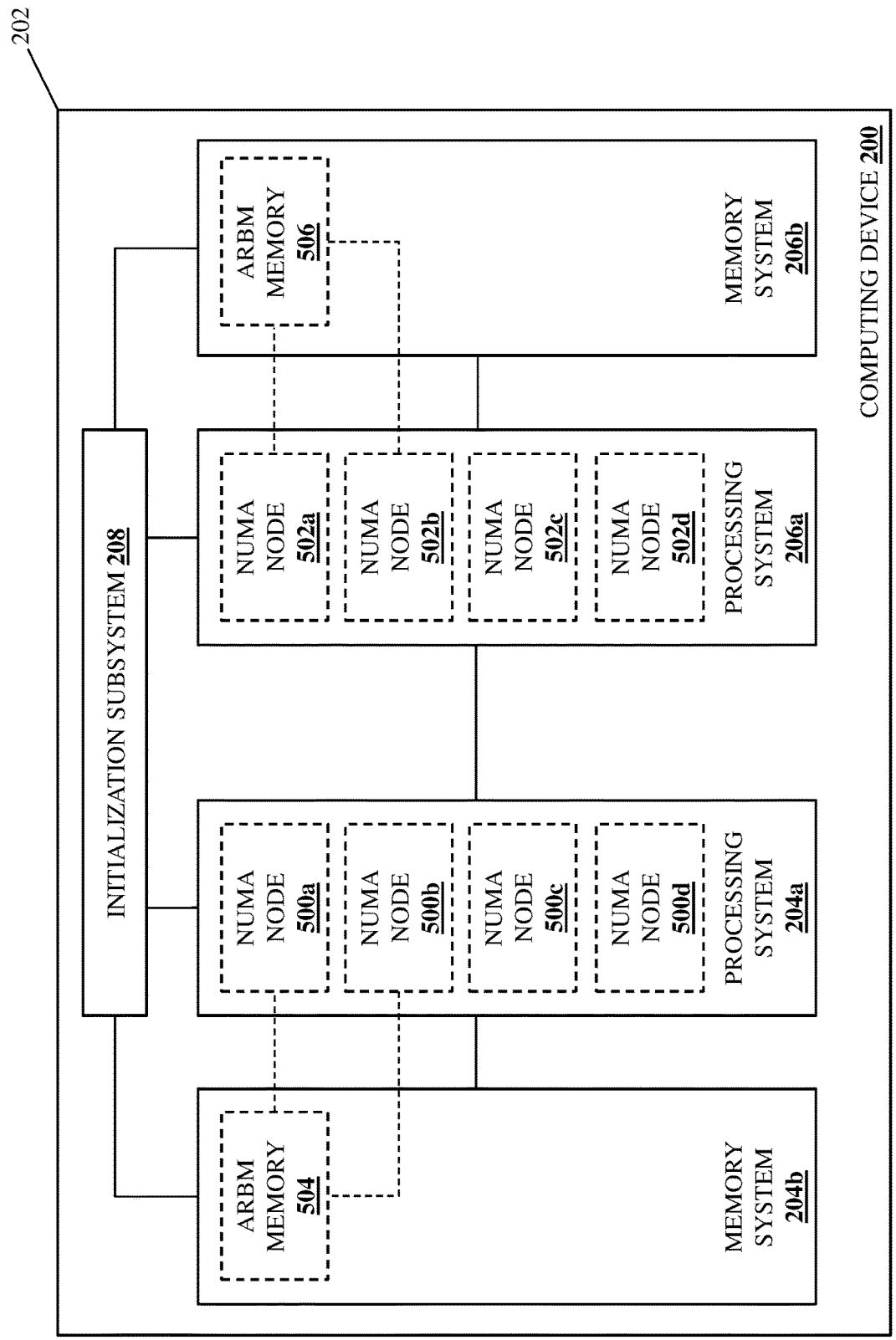
FIG. 5 is a schematic view illustrating an embodiment of the computing device of FIG. 2 performing conventional sub-NUMA clustering fault resilient memory operations.

Referring now to FIGS. 3, 4, and 5, conventional operation of the computing device 200 is illustrated and described in order to detail how fault resilient memory is conventionally provided in NUMA systems. For example, FIG. 3 illustrates a situation in which sub-NUMA clustering is not enabled in the computing device 200, and thus the processing system 204a and memory system 204b are configured to provide a single NUMA node 300, and the processing system 206a and memory system 206b are configured to provide a single NUMA node 302 (i.e., each "physical" NUMA node is the only NUMA node recognized by an operating system in the computing device 200). As will be appreciated by one of skill in the art in possession of the present disclosure, NUMA nodes are generally characterized as being provided by a processing system/memory system combination, and thus the illustration of the NUMA node 300 as being "included" in only the processing system 204a and the NUMA node 302 as being "included" in only the processing system 206a (e.g., via dashed lines in the illustrated example) is provided for clarity with regard to discussions of the features of the corresponding memory systems 204b and 206b, respectfully. Thus, any NUMA nodes illustrated and described in the examples below may be characterized as being provided by both the processing system in which they are illustrated as being "included", as well as the memory system utilized by that processing system, while remaining within the scope of the present disclosure.

As illustrated in FIG. 3, data that will be stored in the memory system 204b and utilized by the NUMA node 300 may then be conventionally protected by configuring the memory system 204b to include Address-Range-Based Mirroring (ARBM) memory 304, and data that will be stored in the memory system 206b and utilized by the NUMA node 302 may be conventionally protected by configuring the memory system 206b to include ARBM memory 306. For example, a user may select a percentage of a memory system that will be reserved for ARBM memory (e.g., the conventional FRM systems discussed above allow a user to select 12.5% ARBM memory or 25% ARBM memory) and, during initialization of the computing device 200, the initialization subsystem 208 will then operate to configure the selected percentage of the memory system as ARBM memory, followed by the NUMA node provided by the processing system mapping to the memory system. Subsequent operation by that NUMA node will then utilize the ARBM memory up to its limit, and then will use the remaining portion of the memory system.

To provide a specific example in which a memory system has 50 GB of memory space, a user may select the 12.5% ARBM memory option discussed above to have 6.25 GB of the memory system designated as unreserved ARBM/mirrored memory, 6.25 GB of the memory system designated as reserved/hidden ARBM/mirroring memory, and 37.5 GB of the memory system designated as unreserved memory. As such, the NUMA node provided by the processing system will then store relatively important data (e.g., the operating system kernel data) in the unreserved ARBM/mirrored memory (up to 6.25 GB) such that that relatively important data is mirrored in the reserved/hidden ARBM/mirroring memory (up to 6.25 GB), after which that NUMA node will store any additional data in the unreserved memory (up to 37.5 GB).

To provide another specific example in which a memory system has 50 GB of memory space, a user may select the 25% ARBM memory option to have 12.5 GB of the memory system designated as unreserved ARBM/mirrored memory, 12.5 GB of the memory system designated as reserved/hidden ARBM/mirroring memory, and 25 GB of the memory system designated as unreserved memory. As such, the NUMA node provided by the processing system will then store relatively important data (e.g., the operating system kernel data) in the unreserved ARBM/mirrored memory (up to 12.5 GB) such that that relatively important data is mirrored in the reserved/hidden ARBM/mirroring memory (up to 12.5 GB), after which that NUMA node will store any additional data in the unreserved memory (up to 25 GB).

Continuing with the example illustrated in FIG. 3, the conventional fault resilient memory operations discussed above generally do not experience issues when sub-NUMA clustering is not enabled, as the available ARBM memory percentages (e.g., 12.5% and 25% discussed above) tend to mirror a large enough portion of a memory system for the single NUMA node provided by its processing system. As such, the ABRM memory 304 will be large enough to store and mirror all the relatively important data (e.g., the operating system kernel data) for the NUMA node 300, and the ARBM memory 306 will be large enough to store and mirror all the relatively important data (e.g., the operating system kernel data) for the NUMA node 302.

However, FIG. 4 illustrates a situation in which sub-NUMA clustering is enabled in the computing device 200, the processing system 204a and memory system 204b are configured to provide two NUMA nodes 400a and 400b, and the processing system 206a and memory system 206b are configured to provide two NUMA nodes 402a and 402b (i.e., each "physical" NUMA node provides two "virtual" NUMA nodes that are each recognized by an operating system in the computing device 200). As illustrated in FIG. 4, data that will be stored in the memory system 204b and utilized by the NUMA nodes 400a and 400b may then be conventionally protected by configuring the memory system 204b to include ARBM memory 404, and data that will be stored in the memory system 206b and utilized by the NUMA nodes 402a and 402b may be conventionally protected by configuring the memory system 206b to include ARBM memory 406. Similarly as discussed above, a user may select a percentage of a memory system that will be reserved for ARBM memory and, during initialization of the computing device 200, the initialization subsystem 208 will then operate to configure the selected percentage of the memory system as ARBM memory, and the two NUMA nodes provided by the processing system will then map to the memory system sequentially (e.g., with the first NUMA node mapping to a first portion of the memory system, and the second NUMA node mapping to a second portion of the memory system). Subsequent operation by those NUMA nodes will then utilize the ARBM memory up to its limit, and then will use the remaining portion of the memory system.

In some situations, the fault resilient memory operations discussed above when sub-NUMA clustering is enabled can result in issues, particularly when the selected ARBM memory percentage (e.g., 12.5% or 25% discussed above) does not mirror a large enough portion of a memory system for both NUMA nodes provided by its processing system. As discussed above, the two NUMA nodes will map to the memory system in order, which will allow the first NUMA node to map to the portion of the memory system that includes the ARBM memory, but may not allow the second NUMA node to entirely map to the portion of the memory system that includes the ARBM memory. As such, relatively important data (e.g., operating system kernel data) used by the second NUMA node may subsequently be stored outside of the ARBM memory in the memory system, and thus will not be mirrored/protected.

Continuing with the specific examples provided above, when the selected ARBM memory percentage is 12.5% (e.g., 6.25 GB of ARBM memory in the 50 GB memory system discussed above), the NUMA node 400a may map to the memory system 204b such that it utilizes the 6.25 GB of the ARBM memory 404 and 12.5 GB of the unreserved memory, while the NUMA node 400b may map to the memory system 204b such that it utilizes 25 GB of the unreserved memory. As such, the relatively important data (e.g., operating system kernel data) used by the NUMA node 400b will be stored in the unreserved memory of the memory system 204b and will not be mirrored/protected. Similarly, the NUMA node 402a may map to the memory system 206b such that it utilizes the 6.25 GB of the ARBM memory 406 and 12.5 GB of the unreserved memory, while the NUMA node 402b may map to the memory system 206b such that it utilizes 25 GB of the unreserved memory. As such, the relatively important data (e.g., operating system kernel data) used by the NUMA node 402b will be stored in the unreserved memory of the memory system 206b and will not be mirrored/protected.

As such, in the event an uncorrectable error occurs with the relatively important data (e.g., operating system kernel data) used by the NUMA node 400b and stored in the unreserved memory of the memory system 204b, and/or with the relatively important data (e.g., operating system kernel data) used by the NUMA node 402b and stored in the unreserved memory of the memory system 206b, those NUMA nodes 400b and/or 402b may fail. While in some situations this issue may be corrected by increasing the ARBM memory percentage to 25% or higher, one of skill in the art in possession of the present disclosure will appreciate how the ARBM memory percentage is limited to 50% (e.g., where half the memory system stores data and half the memory system mirrors that data), and that dedicating a large portion of a memory system to storing a mirror/copy of data that is already stored on that memory system is a generally inefficient use of the memory system.

FIG. 5 illustrates a situation in which sub-NUMA clustering is enabled in the computing device 200, the processing system 204a and memory system 204b are configured to provide four NUMA nodes 500a, 500b, 500c, and 500d, and the processing system 206a and memory system 206b are configured to provide four NUMA nodes 502a, 502b, 502c, and 502d (i.e., each "physical" NUMA node provides four "virtual" NUMA nodes that are each recognized by an operating system in the computing device 200). As illustrated in FIG. 5, data that will be stored the memory system 204b and utilized by the NUMA nodes 500a, 500b, 500c, and 500d may then be conventionally protected by configuring the memory system 204b to include ARBM memory 504, and data that will be stored on the memory system 206b and utilized by the NUMA nodes 502a, 502b, 502c, and 502d may be conventionally protected by configuring the memory system 206b to include ARBM memory 506. Similarly as discussed above, a user may select a percentage of a memory system that will be reserved for ARBM memory and, during initialization of the computing device 200, the initialization subsystem 208 will then operate to configure the selected percentage of the memory system as ARBM memory, with the four NUMA nodes provided by the processing system mapping to the memory system sequentially (e.g., with the first NUMA node mapping to a first portion of the memory system, the second NUMA node mapping to a second portion of the memory system, the third NUMA node mapping to a third portion of the memory system, and the fourth NUMA node mapping to a fourth portion of the memory system). Subsequent operation by those NUMA nodes will then utilize the ARBM memory up to its limit, and then will use the remaining portion of the memory system.

In most (if not all) situations, the fault resilient memory operations discussed above when sub-NUMA clustering is enabled can result in issues, particularly when the selected ARBM memory percentage (e.g., 12.5% or 25% discussed above) does not mirror a large enough portion of a memory system for all of the NUMA nodes provided by its processing system. As discussed above, the four NUMA nodes will map to the memory system in order, which will allow the first NUMA node to map to the portion of the memory system that includes the ARBM memory, but may not allow the second NUMA node to entirely map to the portion of the memory system that includes the ARBM memory, and typically will not allow the third and fourth NUMA nodes to map to any portion of the memory system that includes the ARBM memory. As such, relatively important data (e.g., operating system kernel data) used by the second NUMA node may subsequently be stored outside of the ARBM memory in the memory system, while relatively important data (e.g., operating system kernel data) used by the third and fourth NUMA nodes will subsequently be stored outside of the ARBM memory in the memory system, and thus will not be mirrored/protected.

Continuing with the specific examples provided above, when the selected ARBM memory percentage is 12.5% (e.g., 6.25 GB of ARBM memory in the 50 GB memory system discussed above), the NUMA node 500a may map to the memory system 204b such that it utilizes 6.25 GB of the ARBM memory 504 and 6.25 GB of the unreserved memory, while the NUMA nodes 500b, 500c, and 500d may map to the memory system 204b such that they each utilize 12.5 GB of the unreserved memory. As such, the relatively important data (e.g., operating system kernel data) used by the NUMA nodes 500b, 500c, and 500d will be stored in the unreserved memory of the memory system 204b and will not be not mirrored/protected. Similarly, the NUMA node 502a may map to the memory system 204b such that it utilizes 6.25 GB of the ARBM memory 506 and 6.25 GB of the unreserved memory, while the NUMA nodes 502b, 502c, and 502d may map to the memory system 204b such that they each utilize 12.5 GB of the unreserved memory. As such, the relatively important data (e.g., operating system kernel data) used by the NUMA nodes 502b, 502c, and 502d will be stored in the unreserved memory of the memory system 204b and will not be not mirrored/protected, while the relatively important data (e.g., operating system kernel data) used by the NUMA nodes 502c and 502d will be stored in the unreserved memory of the memory system 204b and will not be mirrored/protected.

As such, in the event an uncorrectable error occurs with the relatively important data (e.g., operating system kernel data) used by the NUMA nodes 500b, 500c, and 500d and stored in the unreserved memory of the memory system 204b, and/or with the relatively important data (e.g., operating system kernel data) used by the NUMA node 502b, 502c, and 502d and stored in the unreserved memory of the memory system 206b, those NUMA nodes 500b, 500c, 500d, 502b, 502c, and/or 502d may fail. Furthermore, increasing the ARBM memory percentage to 25% will often not solve this issue, and even allowing the maximum amount of ARBM memory (e.g., 50%) may not solve this issue in many (if not most) situations. As will be appreciated by one of skill in the art in possession of the present disclosure, the two-NUMA-nodes-per-processing-system and four-NUMA-nodes-per-processing-system configurations illustrated and described herein are conventional sub-NUMA clustering configurations, but future sub-NUMA clustering configurations with more NUMA nodes per processing system will experience similar issues and thus will benefit from the teachings of the present disclosure as well.

Figure 6:
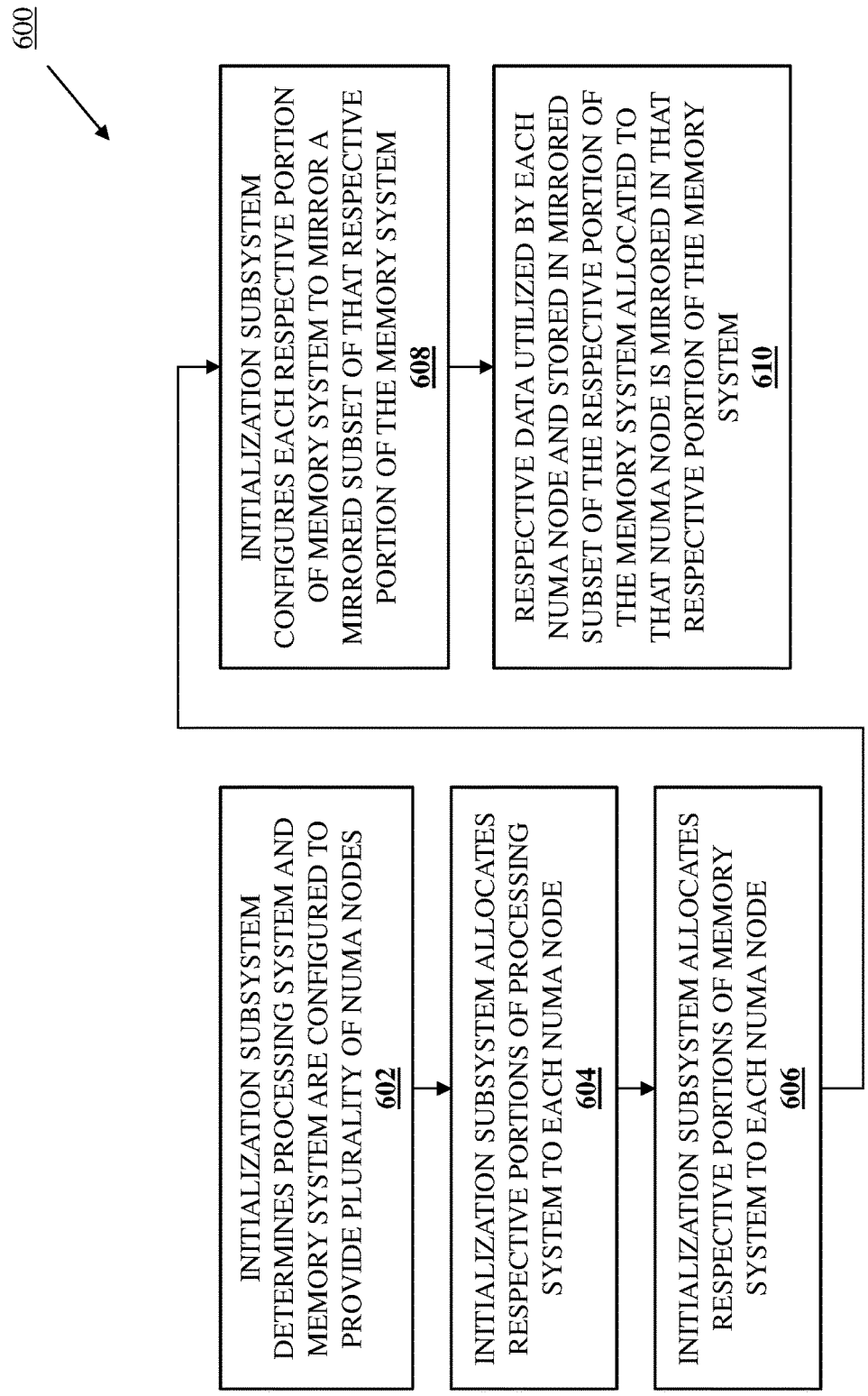
FIG. 6 is a flow chart illustrating an embodiment of a method for providing fault resilient memory for sub-NUMA clusters.

Referring now to FIG. 6, an embodiment of a method 600 for providing fault resistant memory for sub-NUMA clusters is illustrated. As discussed below, the systems and methods of the present disclosure provide for the protection of data stored on a shared memory system by each of a plurality of NUMA nodes. For example, the sub-NUMA clustering fault resilient memory system of the present disclosure may include an initialization subsystem that is coupled to a processing system and a memory system. The initialization subsystem determines that the processing system and the memory system are configured to provide a plurality of NUMA nodes, allocates a respective portion of the memory system to each of the plurality of NUMA nodes, and configures each respective portion of the memory system to mirror a mirrored subset of that respective portion of the memory system. Subsequently, respective data that is utilized by each of the plurality of NUMA nodes provided by the processing system and the memory system and that is stored in the mirrored subset of the respective portion of the memory system allocated to that NUMA node is mirrored in that respective portion of the memory system. As such, processing/memory system combinations may perform sub-NUMA clustering to provide multiple NUMA nodes while ensuring that relatively important data utilized by each of those NUMA nodes is mirrored/protected in the memory system.

Figure 7A:
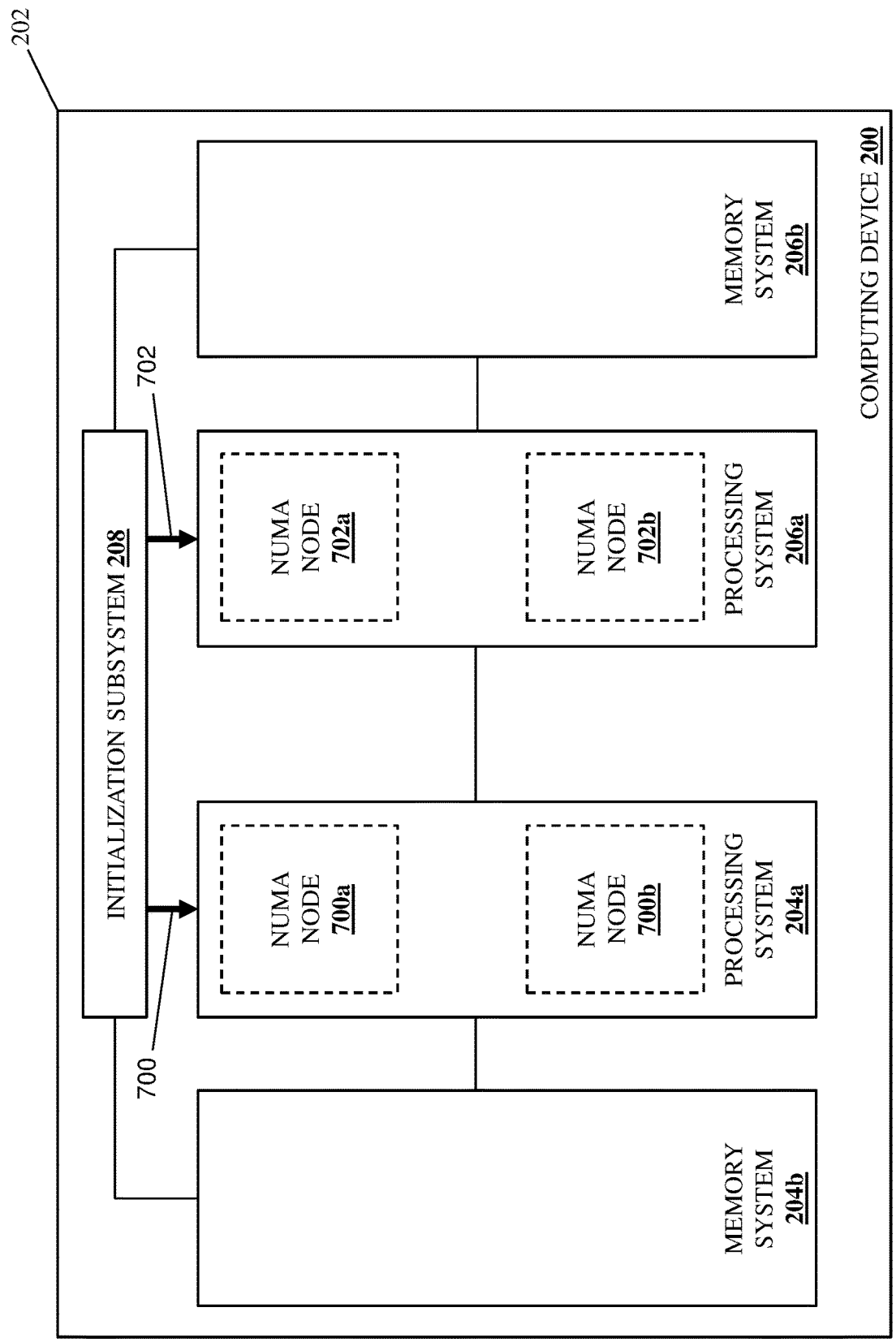
FIG. 7A is a schematic view illustrating an embodiment of the computing device of FIG. 2 operating during the method of FIG. 6.
Figure 8A:
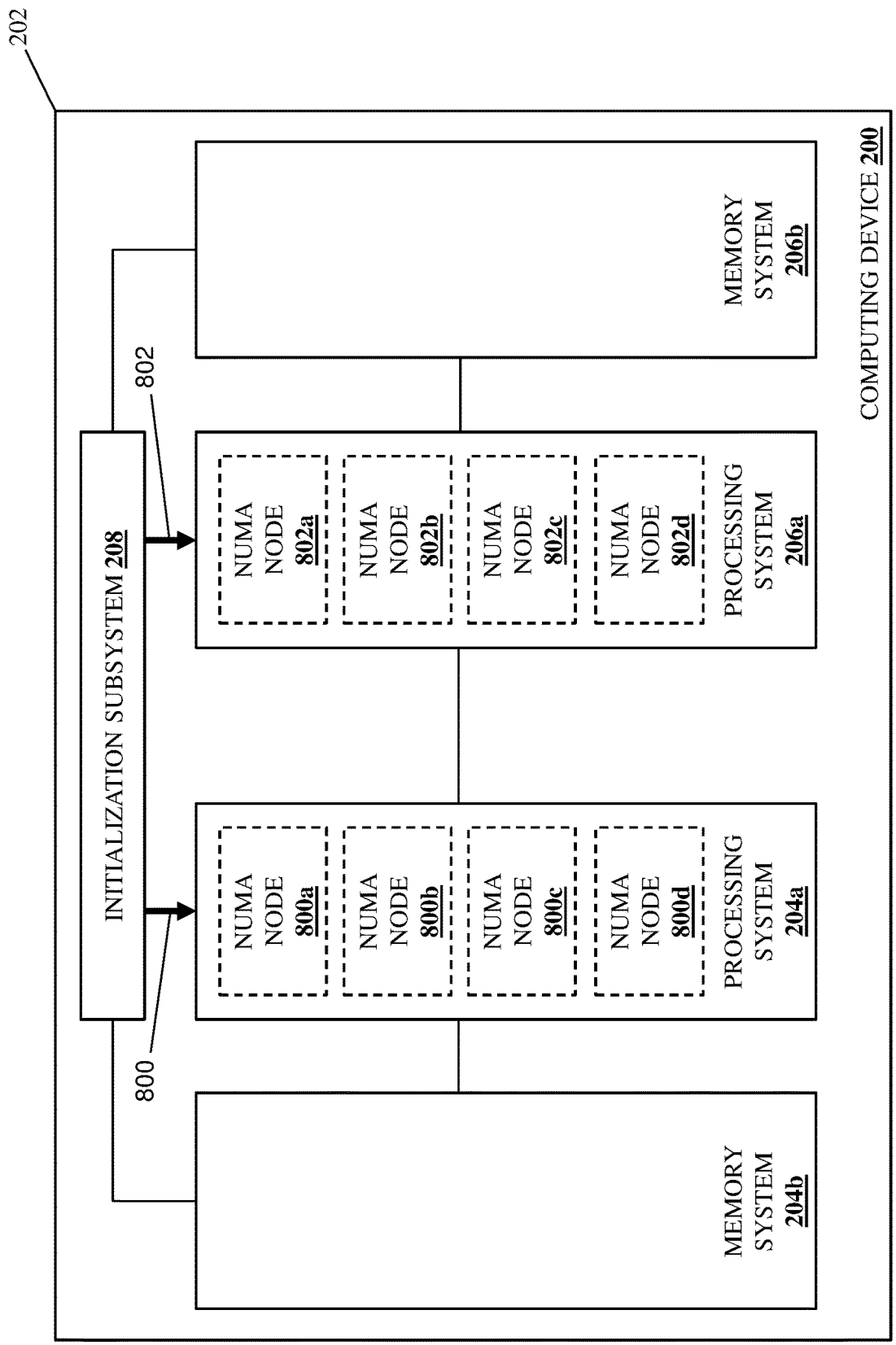
FIG. 8A is a schematic view illustrating an embodiment of the computing device of FIG. 2 operating during the method of FIG. 6.

The method 600 begins at block 602 where an initialization subsystem determines that a processing system and a memory system are configured to provide a plurality of NUMA nodes. In an embodiment, during or prior to the method 600, the computing device 200 may have been configured for sub-NUMA clustering that, as illustrated in FIG. 7A, allows the processing system 204a and memory system 204b to provide NUMA nodes 700a and 700b, and allows the processing system 206a and memory system 206b to provide NUMA nodes 702a and 702b. Similarly, during or prior to the method 600, the computing device 200 may have been configured for sub-NUMA clustering that, as illustrated in FIG. 8A, allows the processing system 204a and memory system 204b to provide NUMA nodes 800a, 800b, 800c, and 800d, and allows the processing system 206a and memory system 206b to provide NUMA nodes 802a, 802b, 802c, and 802d. However, while two-NUMA-nodes-per-processing-system and four-NUMA-nodes-per-processing-system sub-NUMA clustering configuration are illustrated and described herein, one of skill in the art in possession of the present disclosure will appreciate how sub-NUMA clustering that provides more NUMA nodes per processing system will fall within the scope of the present disclosure as well.

As will be appreciated by one of skill in the art in possession of the present disclosure, the sub-NUMA clustering described above may be configured via an option/setting in the initialization subsystem 208 (e.g., a user-set option that is accessible in the BIOS/UEFI setup and stored in a BIOS/UEFI processing system). As such, following power up, reset, or other initialization of the computing device 200, the initialization subsystem 208 may operate to determine that sub-NUMA clustering is enabled (e.g., as set in the user-set option in its BIOS/UEFI processing system) and, in response, may determine a number of NUMA nodes that are configured to be provided on each of the processing system 204a/memory system 204b and the processing system 206a/memory system 206b. However, while a specific technique for determining a number of NUMA nodes a processing system/memory system combination is configured to provide has been described, one of skill in the art in possession of the present disclosure will appreciate that other techniques for identifying a number of NUMA nodes that will be provided on a processing system/memory system combination will fall within the scope of the present disclosure as well.

The method 600 then proceeds to block 604 where the initialization subsystem allocates respective portions of the processing system to each NUMA node. With reference back to FIG. 7A, in an embodiment of block 604, the initialization subsystem 208 may perform processing system allocation operations 700 that allocate respective portions of the processing system 204a to the NUMA node 700a and the NUMA node 700b, and may perform processing system allocation operations 702 that allocate respective portions of the processing system 206a to NUMA node 702a and the NUMA node 702b. For example, during initialization of the computing device 200, the initialization engine 208 may use the number of NUMA nodes that it identified will be provided by the processing systems 204a and 206a via the sub-NUMA clustering, and then may operate to split processing resources of those processing systems 204a and 206b between those NUMA nodes.

In a specific example, if each of the processing systems 204a and 206a include 32 cores, at block 604 the initialization engine 208 may configure 16 cores of the processing system 204a to provide the NUMA node 700a, 16 cores of the processing system 204a to provide the NUMA node 700b, 16 cores of the processing system 206a to provide the NUMA node 702a, and 16 cores of the processing system 206a to provide the NUMA node 702b. However, while specific processing resources (e.g., processing cores) are described as being split evenly between the NUMA nodes that a processing system will provide, one of skill in the art in possession of the present disclosure will appreciate how other processing resources may be split between NUMA nodes, and/or that processing resources may be split unevenly between NUMA nodes, while remaining within the scope of the present disclosure as well.

With reference back to FIG. 8A, in an embodiment of block 604, the initialization subsystem 208 may perform processing system allocation operations 800 that allocate respective portions of the processing system 204a to NUMA nodes 800a, 800b, 800c, and 800d, and may perform processing system allocation operations 802 that allocate respective portions of the processing system 206a to NUMA nodes 802a, 802b, 802c, and 802d. For example, during initialization of the computing device 200, the initialization engine 208 may use the number of NUMA nodes that it identified will be provided by the processing systems 204a and 206a via the sub-NUMA clustering, and then may operate to split processing resources of those processing systems 204a and 206b between those NUMA nodes.

In a specific example, if each of the processing systems 204a and 206a include 32 cores, at block 604 the initialization engine 208 may configure 8 cores of the processing system 204a to provide the NUMA node 800a, 8 cores of the processing system 204a to provide the NUMA node 800b, 8 cores of the processing system 204a to provide the NUMA node 800c, 8 cores of the processing system 204a to provide the NUMA node 800d, 8 cores of the processing system 206a to provide the NUMA node 802a, 8 cores of the processing system 206a to provide the NUMA node 802b, 8 cores of the processing system 206a to provide the NUMA node 802c, and 8 cores of the processing system 206a to provide the NUMA node 802d. However, while specific processing resources (e.g., processing cores) are described as being split evenly between the NUMA nodes that a processing system will provide, one of skill in the art in possession of the present disclosure will appreciate how other processing resources may be split between NUMA nodes, and/or that processing resources may be split unevenly between NUMA nodes, while remaining within the scope of the present disclosure as well.

Figure 7B:
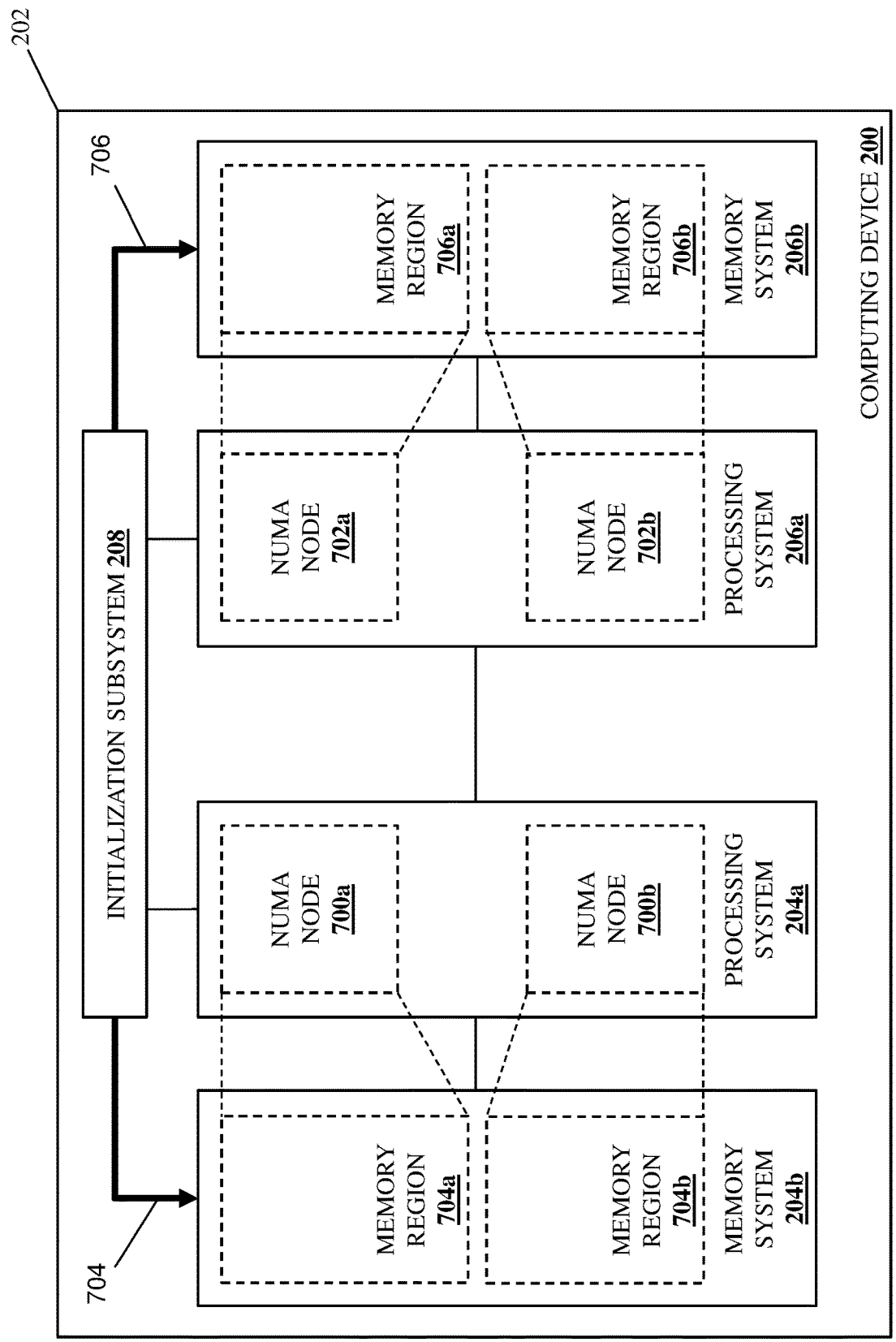
FIG. 7B is a schematic view illustrating an embodiment of the computing device of FIG. 2 operating during the method of FIG. 6.

The method 600 then proceeds to block 606 where the initialization subsystem allocates respective portions of the memory system to each NUMA node. With reference to FIG. 7B, in an embodiment of block 606, the initialization engine 208 may perform memory system allocation operations 704 to allocate a memory region 704a in the memory system 204b to the NUMA node 700a (e.g., as indicated by the dashed lines extending between the NUMA node 700a and the memory region 704a) and allocate a memory region 704b in the memory system 204b to the NUMA node 700b (e.g., as indicated by the dashed lines extending between the NUMA node 700b and the memory region 704b), and may perform memory system allocation operations 706 to allocate a memory region 706a in the memory system 206b to the NUMA node 702a (e.g., as indicated by the dashed lines extending between the NUMA node 702a and the memory region 706a) and allocate a memory region 706b in the memory system 206b to the NUMA node 702b (e.g., as indicated by the dashed lines extending between the NUMA node 702b and the memory region 706b).

Figure 8B:
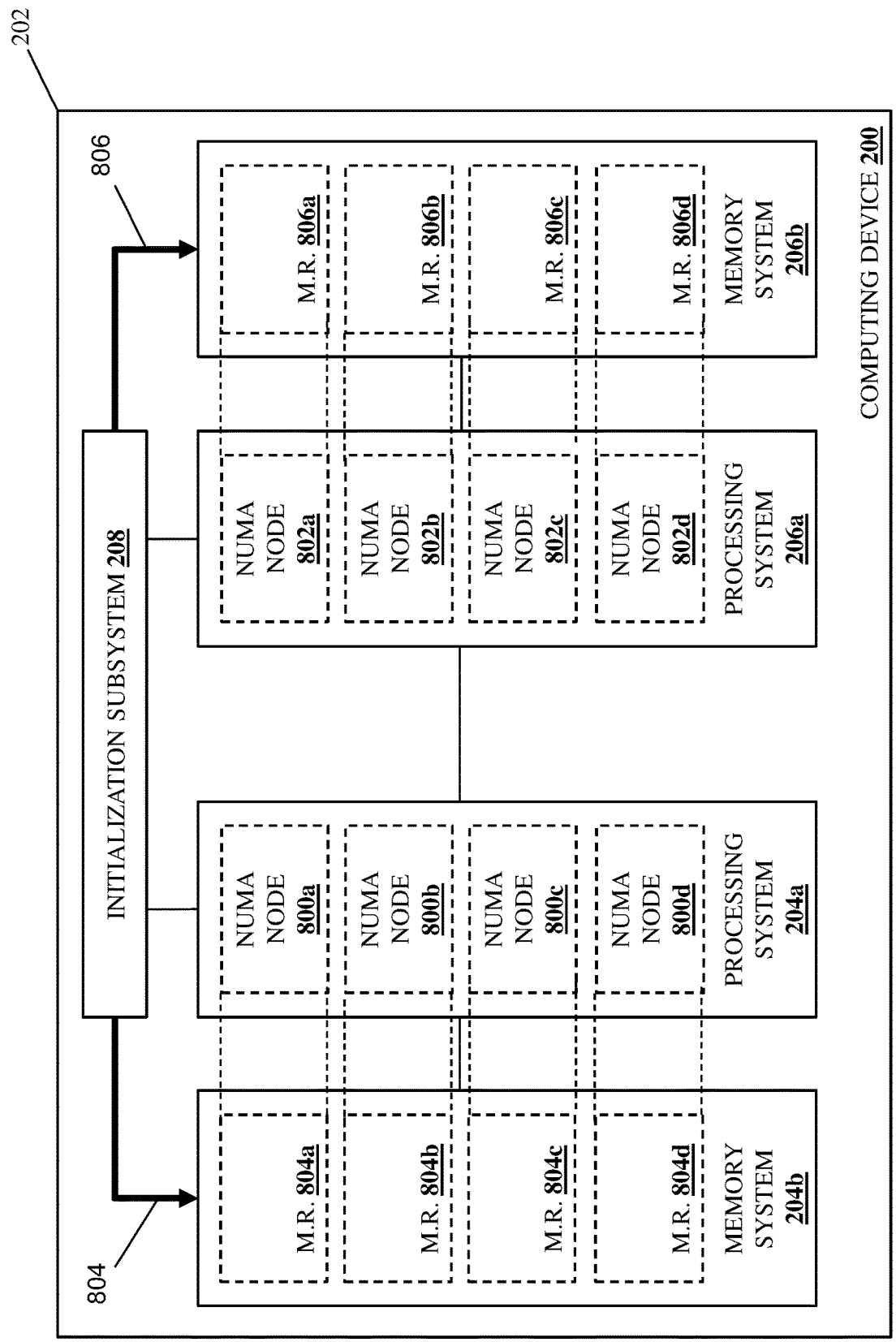
FIG. 8B is a schematic view illustrating an embodiment of the computing device of FIG. 2 operating during the method of FIG. 6.

With reference to FIG. 8B, in an embodiment of block 606, the initialization engine 208 may perform memory system allocation operations 804 to allocate a memory region 804a in the memory system 204b to the NUMA node 800a (e.g., as indicated by the dashed lines extending between the NUMA node 800a and the memory region 804a), allocate a memory region 804b in the memory system 204b to the NUMA node 800b (e.g., as indicated by the dashed lines extending between the NUMA node 800b and the memory region 804b), allocate a memory region 804c in the memory system 204b to the NUMA node 800c (e.g., as indicated by the dashed lines extending between the NUMA node 800c and the memory region 804c), and allocate a memory region 804d in the memory system 204b to the NUMA node 800d (e.g., as indicated by the dashed lines extending between the NUMA node 800d and the memory region 804d).

Similarly, with continued reference to FIG. 8B and in an embodiment of block 606, the initialization engine 208 may perform memory system allocation operations 806 to allocate a memory region 806a in the memory system 204b to the NUMA node 802a (e.g., as indicated by the dashed lines extending between the NUMA node 802a and the memory region 806a), allocate a memory region 806b in the memory system 204b to the NUMA node 802b (e.g., as indicated by the dashed lines extending between the NUMA node 802b and the memory region 806b), allocate a memory region 806c in the memory system 204b to the NUMA node 802c (e.g., as indicated by the dashed lines extending between the NUMA node 802c and the memory region 806c), and allocate a memory region 806d in the memory system 204b to the NUMA node 802d (e.g., as indicated by the dashed lines extending between the NUMA node 802d and the memory region 806d). For example, during initialization of the computing device 200, the initialization engine 208 may use the number of NUMA nodes that it identified will be provided by the memory systems 204b and 206b via the sub-NUMA clustering, and then may operate to split memory resources of those memory systems 204b and 206b between those NUMA nodes.

As such, during initialization of the computing device 200, the initialization engine 208 may use the number of NUMA nodes that it identified will be provided by the memory systems 204b and 206b via the sub-NUMA clustering, and then may operate to split memory resources of those memory systems 204b and 206b between those NUMA nodes. In a specific embodiment, the allocation of any memory region in a memory system to a NUMA node may be performed by programming or otherwise configuring System Address Decoder (SAD) registers in the processing system that provides that NUMA node with that memory system, and one of skill in the art in possession of the present disclosure will recognize how one or more SAD registers in a processing system may be programmed or otherwise configured to identify a memory region address range and one or more memory controllers in a memory system that will be allocated to each NUMA node provided by its processing system.

For example, with reference to FIG. 7B, one or more SAD registers in the processing system 204a may be programmed or otherwise configured to identify an address range of the memory region 704a and one or more memory controllers in the memory system 204b for allocation to the processing resources (e.g., the cores) of the processing system 204a that are allocated to the NUMA node 700a, one or more SAD registers in the processing system 204a may be programmed or otherwise configured to identify an address range of the memory region 704b and one or more memory controllers in the memory system 204b for allocation to the processing resources (e.g., the cores) of the processing system 204a that are allocated to the NUMA node 700b, one or more SAD registers in the processing system 206a may be programmed or otherwise configured to identify an address range of the memory region 706a and one or more memory controllers in the memory system 206b for allocation to the processing resources (e.g., the cores) of the processing system 206a that are allocated to the NUMA node 702a, and one or more SAD registers in the processing system 206a may be programmed or otherwise configured to identify an address range of the memory region 706b and one or more memory controllers in the memory system 206b for allocation to the processing resources (e.g., the cores) of the processing system 206a that are allocated to the NUMA node 706b.

To provide a specific example of the results of the memory system allocation illustrated in FIG. 7B when the memory systems 204b and 206b each include 50 GB of space, the programming of the one or more SAD registers in the processing system 204a may allocate the memory region 704a from 0-25 GB in the memory system 204b and two memory controllers (which may be interleaved) to the 16 cores of the processing system 204a that are allocated to the NUMA node 700a, and may allocate the memory region 704b from 25-50 GB in the memory system 204b and two memory controllers (which may be interleaved) to the 16 cores of the processing system 204a that are allocated to the NUMA node 700b. Similarly, the programming of the one or more SAD registers in the processing system 206a may allocate the memory region 706a from 0-25 GB in the memory system 206b and two memory controllers (which may be interleaved) to the 16 cores of the processing system 206a that are allocated to the NUMA node 702a, and may allocate the memory region 706b from 25-50 GB in the memory system 204b and two memory controllers (which may be interleaved) to the 16 cores of the processing system 206a that are allocated to the NUMA node 702b. However, while particular resources in memory system are described as being split evenly between the NUMA nodes provided by its processing system, one of skill in the art in possession of the present disclosure will recognize that other memory system resources may be split between NUMA nodes, and/or memory system resources may be split unevenly between NUMA nodes, while remaining within the scope of the present disclosure as well.

In another example, with reference to FIG. 8B, one or more SAD registers in the processing system 204a may be programmed or otherwise configured to identify an address range of the memory region 804a and one or more memory controllers in the memory system 204b for allocation to the processing resources (e.g., the cores) of the processing system 204a that are allocated to the NUMA node 800a, one or more SAD registers in the processing system 204a may be programmed or otherwise configured to identify an address range of the memory region 804b and one or more memory controllers in the memory system 204b for allocation to the processing resources (e.g., the cores) of the processing system 204a that are allocated to the NUMA node 800b, one or more SAD registers in the processing system 204a may be programmed or otherwise configured to identify an address range of the memory region 804c and one or more memory controllers in the memory system 204b for allocation to the processing resources (e.g., the cores) of the processing system 204a that are allocated to the NUMA node 800c, and one or more SAD registers in the processing system 204a may be programmed or otherwise configured to identify an address range of the memory region 804d and one or more memory controllers in the memory system 204b for allocation to the processing resources (e.g., the cores) of the processing system 204a that are allocated to the NUMA node 800d.

With continued reference to FIG. 8B, one or more SAD registers in the processing system 206a may be programmed or otherwise configured to identify an address range of the memory region 806a and one or more memory controllers in the memory system 206b for allocation to the processing resources (e.g., the cores) of the processing system 206a that are allocated to the NUMA node 802a, one or more SAD registers in the processing system 206a may be programmed or otherwise configured to identify an address range of the memory region 806b and one or more memory controllers in the memory system 206b for allocation to the processing resources (e.g., the cores) of the processing system 206a that are allocated to the NUMA node 802b, one or more SAD registers in the processing system 206a may be programmed or otherwise configured to identify an address range of the memory region 806c and one or more memory controllers in the memory system 206b for allocation to the processing resources (e.g., the cores) of the processing system 206a that are allocated to the NUMA node 802c, and one or more SAD registers in the processing system 206a may be programmed or otherwise configured to identify an address range of the memory region 806d and one or more memory controllers in the memory system 206b for allocation to the processing resources (e.g., the cores) of the processing system 206a that are allocated to the NUMA node 802d.

To provide a specific example of the results of the memory system allocation illustrated in FIG. 8B when the memory systems 204b and 206b each include 50 GB of space, the programming of the one or more SAD registers in the processing system 204a may allocate the memory region 804a from 0-12.5 GB in the memory system 204b and a single memory controller to the 8 cores of the processing system 204a that are allocated to the NUMA node 800a, may allocate the memory region 804b from 12.5-25 GB in the memory system 204b and a single memory controller to the 8 cores of the processing system 204a that are allocated to the NUMA node 800b, may allocate the memory region 804c from 25-37.5 GB in the memory system 204b and a single memory controller to the 8 cores of the processing system 204a that are allocated to the NUMA node 800c, and may allocate the memory region 804d from 37.5-50 GB in the memory system 204b and a single memory controller to the 8 cores of the processing system 204a that are allocated to the NUMA node 800d.

Similarly, the programming of the one or more SAD registers in the processing system 206a may allocate the memory region 806a from 0-12.5 GB in the memory system 206b and a single memory controller to the 8 cores of the processing system 206a that are allocated to the NUMA node 802a, may allocate the memory region 806b from 12.5-25 GB in the memory system 206b and a single memory controller to the 8 cores of the processing system 206a that are allocated to the NUMA node 802b, may allocate the memory region 806c from 25-37.5 GB in the memory system 206b and a single memory controller to the 8 cores of the processing system 206a that are allocated to the NUMA node 802c, and may allocate the memory region 806d from 37.5-50 GB in the memory system 206b and a single memory controller to the 8 cores of the processing system 206a that are allocated to the NUMA node 802d. However, while particular resources in memory system are described as being split evenly between the NUMA nodes provided by its processing system, one of skill in the art in possession of the present disclosure will recognize that other memory system resources may be split between NUMA nodes, and/or memory system resources may be split unevenly between NUMA nodes, while remaining within the scope of the present disclosure as well. Furthermore, while a specific technique for allocating memory regions to NUMA nodes has been described, one of skill in the art in possession of the present disclosure will appreciate that other NUMA node memory region allocation techniques may fall within the scope of the present disclosure as well.

The method 600 then proceeds to block 608 where the initialization subsystem configures each respective portion of the memory system to mirror a mirrored subset of that respective portion of the memory system. In an embodiment, during or prior to the method 600, a user of the computing device 200 may have enabled memory protection for data that will be utilized by NUMA nodes provided in the computing device 200. For example, during runtime of the computing device 200 (e.g., when an operating system provided in the computing device 200 controls operation of the computing device) immediately prior to the initialization of the computing device 200 described at blocks 602-606 of the method 600, a user of the computing device 200 may have enabled memory protection (e.g., via the Fault Resistant Memory (FRM) system discussed above) for NUMA nodes that are provided by the computing device 200, defined a percentage of memory that will be protected for each of those NUMA nodes, and/or defined any other memory protection characteristics that would be apparent to one of skill in the art in possession of the present disclosure using, for example, a Graphical User Interface (GUI) or other interface that one of skill in the art in possession of the present disclosure would appreciate allows a user to define memory protection operations With reference to FIG. 7C, in an embodiment of block 608, the initialization engine 208 may perform memory mirroring configuration operations 708 to configure mirrored memory 708a (identified as Address-Range-Based Mirroring (ARBM) in the illustrated examples) in a portion of the memory region 704a of the memory system 204b allocated to the NUMA node 700a, and configure mirrored memory 708b (identified as ARBM in the illustrated examples) in a portion of the memory region 704b of the memory system 204b allocated to the NUMA node 700b, and may perform memory mirroring configuration operations 710 to configure mirrored memory 710a (identified as ARBM in the illustrated examples) in a portion of the memory region 706a of the memory system 206b allocated to the NUMA node 702a, and configure mirrored memory 710b (identified as ARBM in the illustrated examples) in a portion of the memory region 706b of the memory system 206b allocated to the NUMA node 702b.

Figure 8C:
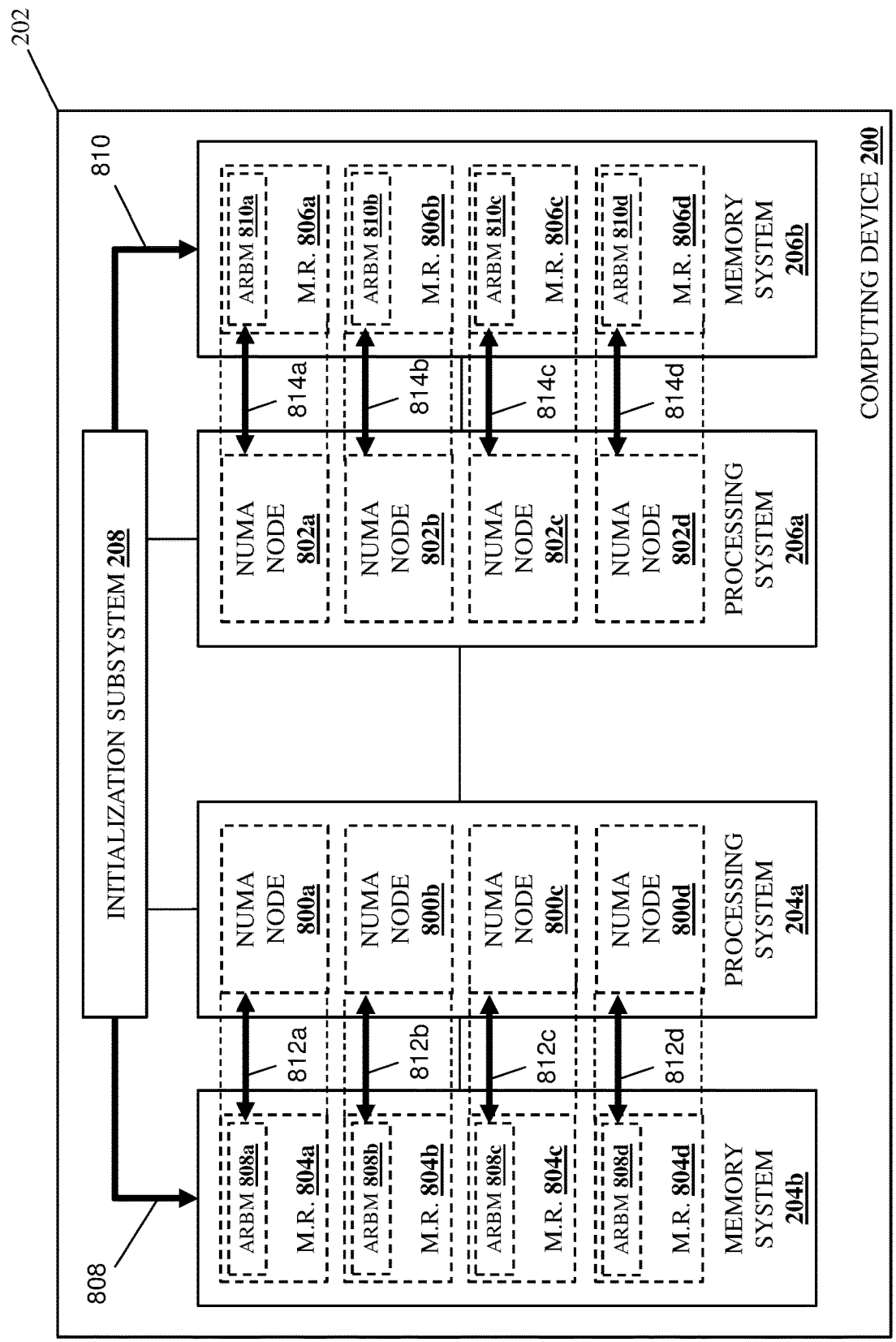
FIG. 8C is a schematic view illustrating an embodiment of the computing device of FIG. 2 operating during the method of FIG. 6.

With reference to FIG. 8C, in an embodiment of block 608, the initialization engine 208 may perform memory mirroring configuration operations 808 to configure mirrored memory 808a (identified as ARBM in the illustrated examples) in a portion of the memory region 804a of the memory system 204b allocated to the NUMA node 800a, configure mirrored memory 808b (identified as ARBM in the illustrated examples) in a portion of the memory region 804b of the memory system 204b allocated to the NUMA node 800b, configure mirrored memory 808c (identified as ARBM in the illustrated examples) in a portion of the memory region 804c of the memory system 204b allocated to the NUMA node 800c, and configure mirrored memory 808d (identified as ARBM in the illustrated examples) in a portion of the memory region 804d of the memory system 204b allocated to the NUMA node 800d.

Similarly, in an embodiment of block 608, the initialization engine 208 may perform memory mirroring configuration operations 810 to configure mirrored memory 810a (identified as ARBM in the illustrated examples) in a portion of the memory region 806a of the memory system 206b allocated to the NUMA node 802a, configure mirrored memory 810b (identified as ARBM in the illustrated examples) in a portion of the memory region 806b of the memory system 206b allocated to the NUMA node 802b, configure mirrored memory 810c (identified as ARBM in the illustrated examples) in a portion of the memory region 806c of the memory system 206b allocated to the NUMA node 802c, and configure mirrored memory 810d (identified as ARBM in the illustrated examples) in a portion of the memory region 806d of the memory system 206b allocated to the NUMA node 802d. For example, during initialization of the computing device 200, the initialization engine 208 may identify the percentage of memory defined by the user of the computing device 200 for protection for each of the NUMA nodes provided by a processing system, and then may operate to configure that percentage of each memory region allocated in a memory system to a respective NUMA node as mirrored memory.

As such, during initialization of the computing device 200, the initialization engine 208 may use the percentage of memory defined by the user of the computing device 200 for protection for each of the NUMA nodes provided by a processing system, and then may operate to configure that percentage of the memory regions allocated in each of the memory systems 204b and 206b to NUMA nodes as mirrored memory. In a specific embodiment, the configuration of a percentage of any memory region in a memory system allocated to a NUMA node as mirrored memory may be performed by programming or otherwise configuring System Address Decoder (SAD) registers in the processing system that provides that NUMA node with that memory system, and one of skill in the art in possession of the present disclosure will recognize how one or more SAD registers in a processing system may be programmed or otherwise configured to identify a first memory region address range that will operate as mirrored memory in a memory system that will be allocated to each NUMA node provided by its processing system.

Figure 7C:
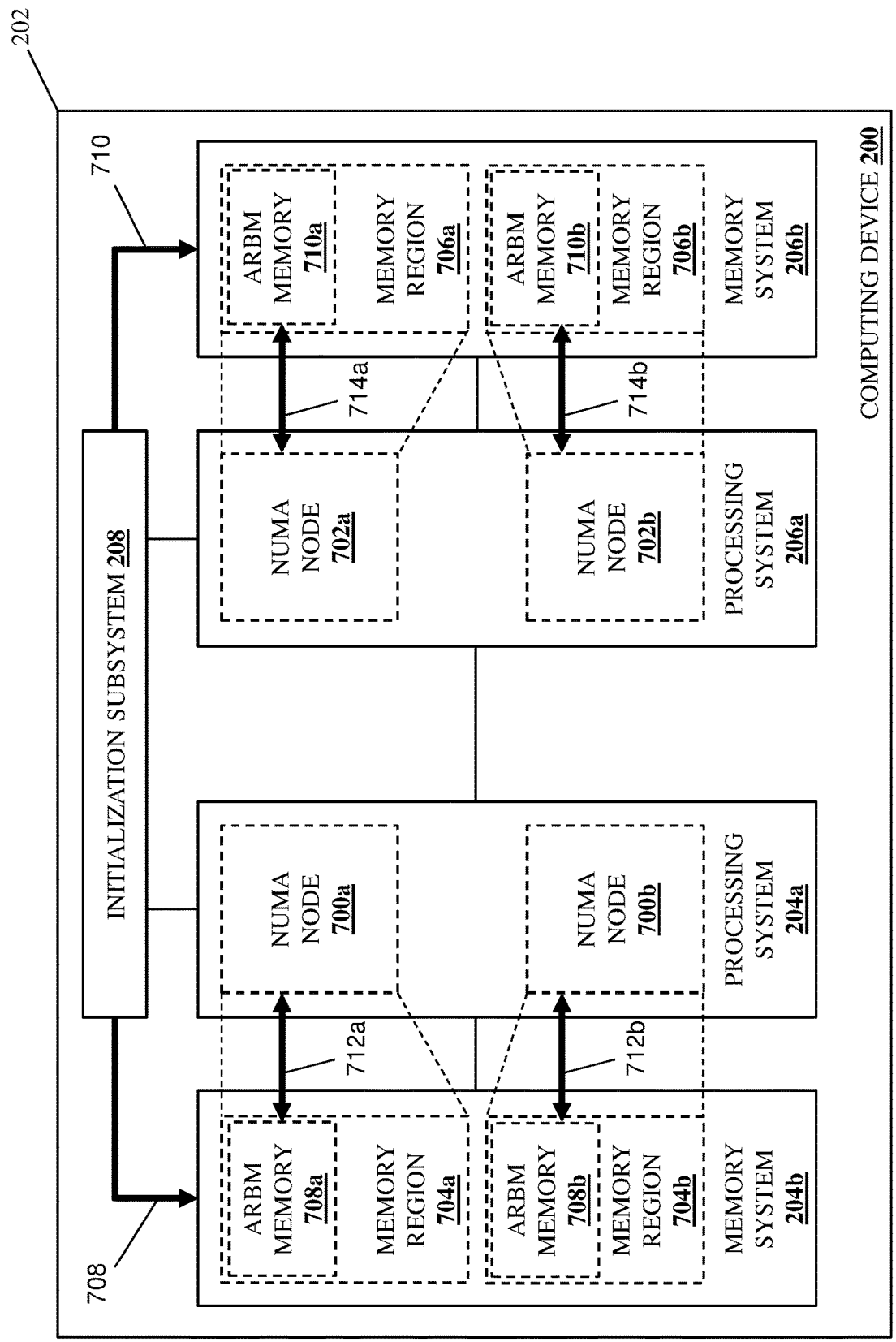
FIG. 7C is a schematic view illustrating an embodiment of the computing device of FIG. 2 operating during the method of FIG. 6.

For example, with reference to FIG. 7C, one or more SAD registers in the processing system 204a may be programmed or otherwise configured to identify a mirrored memory address range (e.g., an unreserved ARBM mirrored memory) that provides the mirrored memory 708a in the memory region 704a of the memory system 204b allocated to the NUMA node 700a, one or more SAD registers in the processing system 204a may be programmed or otherwise configured to identify a mirrored memory address range (e.g., an unreserved ARBM mirrored memory) that provides the mirrored memory 708b in the memory region 704b of the memory system 204b allocated to the NUMA node 700b, one or more SAD registers in the processing system 206a may be programmed or otherwise configured to identify a mirrored memory address range (e.g., an unreserved ARBM mirrored memory) that provides the mirrored memory 710a in the memory region 706a of the memory system 206b allocated to the NUMA node 702a, and one or more SAD registers in the processing system 206a may be programmed or otherwise configured to identify a mirrored memory address range (e.g., an unreserved ARBM mirrored memory) that provides the mirrored memory 710b in the memory region 706b of the memory system 206b allocated to the NUMA node 702b.

As will be appreciated by one of skill in the art in possession of the present disclosure, the SAD register(s) used to configure the mirrored memory in each memory region allocated to each NUMA mode may be different than the SAD register(s) used to allocate the mirrored memory in each memory region to each NUMA mode To provide a specific example of the results of the memory system allocation illustrated in FIG. 7C when the memory regions 704a and 704b in the memory system 204b and the memory regions 710a and 710b in the memory system 206b are each 25 GB, and the user has selected the 25% ARBM memory option discussed above, each of the mirrored memory 708a, 708b, 710a, and 710b in the memory regions 704a, 704b, 706a, and 706b, respectively, may be 6.25 GB.

In another example, with reference to FIG. 8C, one or more SAD registers in the processing system 204a may be programmed or otherwise configured to identify a mirrored memory address range (e.g., an unreserved ARBM mirrored memory) that provides the mirrored memory 808a in the memory region 804a of the memory system 204b allocated to the NUMA node 800a, one or more SAD registers in the processing system 204a may be programmed or otherwise configured to identify a mirrored memory address range (e.g., an unreserved ARBM mirrored memory) that provides the mirrored memory 808b in the memory region 804b of the memory system 204b allocated to the NUMA node 800b, one or more SAD registers in the processing system 204a may be programmed or otherwise configured to identify a mirrored memory address range (e.g., an unreserved ARBM mirrored memory) that provides the mirrored memory 808c in the memory region 804c of the memory system 204b allocated to the NUMA node 800c, and one or more SAD registers in the processing system 204a may be programmed or otherwise configured to identify a mirrored memory address range (e.g., an unreserved ARBM mirrored memory) that provides the mirrored memory 808d in the memory region 804d of the memory system 204b allocated to the NUMA node 800d.

Similarly, with continued reference to FIG. 8C, one or more SAD registers in the processing system 206a may be programmed or otherwise configured to identify a mirrored memory address range (e.g., an unreserved ARBM mirrored memory) that provides the mirrored memory 810a in the memory region 806a of the memory system 206b allocated to the NUMA node 802a, one or more SAD registers in the processing system 206a may be programmed or otherwise configured to identify a mirrored memory address range (e.g., an unreserved ARBM mirrored memory) that provides the mirrored memory 810b in the memory region 806b of the memory system 206b allocated to the NUMA node 820b, one or more SAD registers in the processing system 206a may be programmed or otherwise configured to identify a mirrored memory address range (e.g., an unreserved ARBM mirrored memory) that provides the mirrored memory 810c in the memory region 806c of the memory system 206b allocated to the NUMA node 802c, and one or more SAD registers in the processing system 206a may be programmed or otherwise configured to identify a mirrored memory address range (e.g., an unreserved ARBM mirrored memory) that provides the mirrored memory 810d in the memory region 806d of the memory system 206b allocated to the NUMA node 802d.

As will be appreciated by one of skill in the art in possession of the present disclosure, the SAD register(s) used to configure the mirrored memory in each memory region allocated to each NUMA mode may be different than the SAD register(s) used to allocate the mirrored memory in each memory region to each NUMA mode To provide a specific example of the results of the memory system allocation illustrated in FIG. 8C when the memory regions 804a, 804b, 804c, and 804d in the memory system 204b and the memory regions 806a, 806b, 806c, and 806d in the memory system 206b are each 12.5 GB, and the user has selected the 25% ARBM memory option discussed above, each of the mirrored memory 808a, 808b, 808c, 808d, 810a, 810b, 810c, and 810d in the memory regions 804a, 804b, 804c, 804d, 806a, 806b, 806c, and 806d, respectively, may be 3.125 GB.

The method 600 then proceeds to block 610 where respective data that is utilized by each NUMA node and that is stored in the mirror subset of the respective portion of the memory system allocated to that NUMA node is mirrored in that respective portion of the memory system. In an embodiment, at block 610, any of the NUMA nodes provided by a processing system may operate to transmit data to the mirrored memory included in the memory region allocated to it in the memory system such that that data is then stored in the mirrored memory address range and copied to the mirroring memory address range defined for that mirrored memory. Furthermore, any of the NUMA nodes provided by a processing system may also operate to retrieve data from the mirrored memory included in the memory region allocated to it in the memory system, which may include retrieving that data from the mirrored memory address range defined for that mirrored memory in the event that data is not corrupted, or retrieving the copy of that data from the mirroring memory address range defined for that mirrored memory in the event that data stored in the mirrored memory address range is corrupted.

As such, with reference back to FIG. 7C, at block 610 the NUMA node 700a may perform data storage and retrieval operations 712a which, in a specific example, may include the NUMA node 700a storing operating system kernel data or other relatively important data in the mirrored memory 708a of its allocated memory region 704a, and either retrieving that operating system kernel data or other relatively important data from the mirrored memory address range defined for the mirrored memory 708a in the event that data is not corrupted, or retrieving the copy of that data from the mirroring memory address range defined for the mirrored memory 708a in the event that data stored in the mirrored memory address range is corrupted. Similarly, at block 610 the NUMA node 700b may perform data storage and retrieval operations 712b which, in a specific example, may include the NUMA node 700b storing operating system kernel data or other relatively important data in the mirrored memory 708b of its allocated memory region 704b, and either retrieving that operating system kernel data or other relatively important data from the mirrored memory address range defined for the mirrored memory 708b in the event that data is not corrupted, or retrieving the copy of that data from the mirroring memory address range defined for the mirrored memory 708*b* in the event that data stored in the mirrored memory address range is corrupted.

Similarly, at block 610 the NUMA node 702*a* may perform data storage and retrieval operations 714*a* which, in a specific example, may include the NUMA node 702*a* storing operating system kernel data or other relatively important data in the mirrored memory 710*a* of its allocated memory region 706*a*, and either retrieving that operating system kernel data or other relatively important data from the mirrored memory address range defined for the mirrored memory 710*a* in the event that data is not corrupted, or retrieving the copy of that data from the mirroring memory address range defined for the mirrored memory 710*a* in the event that data stored in the mirrored memory address range is corrupted. Similarly, at block 610 the NUMA node 702*b* may perform data storage and retrieval operations 714*b* which, in a specific example, may include the NUMA node 702*b* storing operating system kernel data or other relatively important data in the mirrored memory 710*b* of its allocated memory region 706*b*, and either retrieving that operating system kernel data or other relatively important data from the mirrored memory address range defined for the mirrored memory 710*b* in the event that data is not corrupted, or retrieving the copy of that data from the mirroring memory address range defined for the mirrored memory 710*b* in the event that data stored in the mirrored memory address range is corrupted. Thus, operating system kernel data may be stored and utilized by each NUMA node provided in the computing device 200 safely (i.e., with a redundant copy of that operating system kernel data available in the event the main copy of the operating system kernel data become corrupted).

With reference back to FIG. 8C, at block 610 the NUMA node 800*a* may perform data storage and retrieval operations 812*a* which, in a specific example, may include the NUMA node 800*a* storing operating system kernel data or other relatively important data in the mirrored memory 808*a* of its allocated memory region 804*a*, and either retrieving that operating system kernel data or other relatively important data from the mirrored memory address range defined for the mirrored memory 808*a* in the event that data is not corrupted, or retrieving the copy of that data from the mirroring memory address range defined for the mirrored memory 808*a* in the event that data stored in the mirrored memory address range is corrupted. Similarly, at block 610 the NUMA node 800*b* may perform data storage and retrieval operations 812*b* which, in a specific example, may include the NUMA node 800*b* storing operating system kernel data or other relatively important data in the mirrored memory 808*b* of its allocated memory region 804*b*, and either retrieving that operating system kernel data or other relatively important data from the mirrored memory address range defined for the mirrored memory 808*b* in the event that data is not corrupted, or retrieving the copy of that data from the mirroring memory address range defined for the mirrored memory 808*b* in the event that data stored in the mirrored memory address range is corrupted.

Similarly, at block 610 the NUMA node 800*c* may perform data storage and retrieval operations 812*c* which, in a specific example, may include the NUMA node 800*c* storing operating system kernel data or other relatively important data in the mirrored memory 808*c* of its allocated memory region 804*c*, and either retrieving that operating system kernel data or other relatively important data from the mirrored memory address range defined for the mirrored memory 808*c* in the event that data is not corrupted, or retrieving the copy of that data from the mirroring memory address range defined for the mirrored memory 808*c* in the event that data stored in the mirrored memory address range is corrupted. Similarly, at block 610 the NUMA node 800*d* may perform data storage and retrieval operations 812*d* which, in a specific example, may include the NUMA node 800*d* storing operating system kernel data or other relatively important data in the mirrored memory 808*d* of its allocated memory region 804*d*, and either retrieving that operating system kernel data or other relatively important data from the mirrored memory address range defined for the mirrored memory 808*d* in the event that data is not corrupted, or retrieving the copy of that data from the mirroring memory address range defined for the mirrored memory 808*d* in the event that data stored in the mirrored memory address range is corrupted.

Similarly, at block 610 the NUMA node 802*a* may perform data storage and retrieval operations 814*a* which, in a specific example, may include the NUMA node 802*a* storing operating system kernel data or other relatively important data in the mirrored memory 810*a* of its allocated memory region 806*a*, and either retrieving that operating system kernel data or other relatively important data from the mirrored memory address range defined for the mirrored memory 810*a* in the event that data is not corrupted, or retrieving the copy of that data from the mirroring memory address range defined for the mirrored memory 810*a* in the event that data stored in the mirrored memory address range is corrupted. Similarly, at block 610 the NUMA node 802*b* may perform data storage and retrieval operations 814*b* which, in a specific example, may include the NUMA node 802*b* storing operating system kernel data or other relatively important data in the mirrored memory 810*b* of its allocated memory region 806*b*, and either retrieving that operating system kernel data or other relatively important data from the mirrored memory address range defined for the mirrored memory 810*b* in the event that data is not corrupted, or retrieving the copy of that data from the mirroring memory address range defined for the mirrored memory 810*b* in the event that data stored in the mirrored memory address range is corrupted.

Similarly, at block 610 the NUMA node 802*c* may perform data storage and retrieval operations 814*c* which, in a specific example, may include the NUMA node 802*c* storing operating system kernel data or other relatively important data in the mirrored memory 810*c* of its allocated memory region 806*c*, and either retrieving that operating system kernel data or other relatively important data from the mirrored memory address range defined for the mirrored memory 810*c* in the event that data is not corrupted, or retrieving the copy of that data from the mirroring memory address range defined for the mirrored memory 810*c* in the event that data stored in the mirrored memory address range is corrupted. Similarly, at block 610 the NUMA node 802*d* may perform data storage and retrieval operations 814*d* which, in a specific example, may include the NUMA node 802*d* storing operating system kernel data or other relatively important data in the mirrored memory 810*d* of its allocated memory region 806*d*, and either retrieving that operating system kernel data or other relatively important data from the mirrored memory address range defined for the mirrored memory 810*d* in the event that data is not corrupted, or retrieving the copy of that data from the mirroring memory address range defined for the mirrored memory 810*d* in the event that data stored in the mirrored memory address range is corrupted. Thus, operating system kernel data may be stored and utilized by each NUMA node provided in the computing device 200 safely (i.e., with a redundant copy of that operating system kernel data available in the event the main copy of the operating system kernel data become corrupted).

Thus, systems and methods have been described that provide for the protection of data stored on a NUMA memory by each of a plurality of NUMA nodes. For example, the sub-NUMA clustering fault resilient memory system of the present disclosure may include a BIOS/UEFI that is coupled to a NUMA processor and NUMA memory. The BIOS/UEFI determines that the NUMA processor and the NUMA memory are configured to provide a plurality of NUMA nodes, allocates a respective portion of the NUMA memory to each of the plurality of NUMA nodes, and configures each respective portion of the NUMA memory to mirror a mirrored subset of that respective portion of the NUMA memory. Subsequently, respective data that is utilized by each of the plurality of NUMA nodes provided by the NUMA processor and the NUMA memory and that is stored in the mirrored subset of the respective portion of the NUMA memory allocated to that NUMA node is mirrored in that respective portion of the NUMA memory. As such, NUMA processor/memory combinations may perform sub-NUMA clustering to provide multiple NUMA nodes while ensuring that relatively important data utilized by each of those NUMA nodes is mirrored/protected in the NUMA memory.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A sub-Non-Uniform Memory Access (sub-NUMA) clustering fault resilient memory system, comprising:
   a Non-Uniform Memory Access (NUMA) processor;
   a NUMA memory; and
   an initialization subsystem that is coupled to the NUMA processor and the NUMA memory, wherein the initialization subsystem is configured to:
      determine that the NUMA processor is configured to provide a plurality of NUMA nodes;
      allocate a respective portion of the NUMA memory to each of the plurality of NUMA nodes; and
      configure each respective portion of the NUMA memory to mirror a mirrored subset of that respective portion of the NUMA memory such that respective data that is utilized by each of the plurality of NUMA nodes provided by respective NUMA processor resources in the NUMA processor and that is stored in the mirrored subset of the respective portion of the NUMA memory allocated to that NUMA node is mirrored in that respective portion of the NUMA memory.

2. The system of claim 1, wherein the allocating the respective portion of the NUMA memory to each of the plurality of NUMA nodes includes allocating an equal portion of the NUMA memory to each of the plurality of NUMA nodes.

3. The system of claim 1, wherein the configuring each respective portion of the NUMA memory to mirror the mirrored subset of that respective portion of the NUMA memory includes configuring each respective portion of the NUMA memory to mirror an equal percentage of that respective portion of the NUMA memory.

4. The system of claim 1, wherein the allocating the respective portion of the NUMA memory to each of the plurality of NUMA nodes includes configuring, for each of the plurality of NUMA nodes, at least one System Address Decoder (SAD) register in the NUMA processor to identify a memory address range and one or more memory controllers for use by that NUMA node.

5. The system of claim 1, wherein the configuring each respective portion of the NUMA memory to mirror the mirrored subset of that respective portion of the NUMA memory includes configuring a mirroring subset of that respective portion of the NUMA memory as reserved memory that mirrors data stored in the mirrored subset that is configured as unreserved memory.

6. The system of claim 1, wherein the respective data that is utilized by each of the plurality of NUMA nodes and that is mirrored includes operating system kernel data for that NUMA node.

7. An Information Handling System (IHS), comprising:
   an initialization processing system; and
   an initialization memory that is coupled to the initialization processing system and that includes instructions that, when executed by the initialization processing system, cause the initialization processing system to provide an initialization engine that is configured to:
      determine that a Non-Uniform Memory Access (NUMA) processor and a NUMA memory are configured to provide a plurality of NUMA nodes;
      allocate a respective portion of the NUMA memory to each of the plurality of NUMA nodes; and
      configure each respective portion of the NUMA memory to mirror a mirrored subset of that respective portion of the NUMA memory such that data that is utilized by each of the plurality of NUMA nodes provided by the NUMA processor and the NUMA memory and that is stored in the mirrored subset of the respective portion of the NUMA memory allocated to that NUMA node is mirrored in that respective portion of the NUMA memory.

8. The IHS of claim 7, wherein the allocating the respective portion of the NUMA memory to each of the plurality of NUMA nodes includes allocating an equal portion of the NUMA memory to each of the plurality of NUMA nodes.

9. The IHS of claim 7, wherein the configuring each respective portion of the NUMA memory to mirror the mirrored subset of that respective portion of the NUMA memory includes configuring each respective portion of the NUMA memory to mirror an equal percentage of that respective portion of the NUMA memory.

10. The IHS of claim 7, wherein the allocating the respective portion of the NUMA memory to each of the plurality of NUMA nodes includes configuring, for each of the plurality of NUMA nodes, at least one System Address Decoder (SAD) register in the NUMA processor to identify a memory address range and one or more memory controllers for use by that NUMA node.

11. The IHS of claim 7, wherein the configuring each respective portion of the NUMA memory to mirror the mirrored subset of that respective portion of the NUMA memory includes configuring a mirroring subset of that respective portion of the NUMA memory as reserved memory that mirrors data stored in the mirrored subset that is configured as unreserved memory.

12. The IHS of claim 7, wherein the respective data that is utilized by each of the plurality of NUMA nodes and that is mirrored includes operating system kernel data for that NUMA node.

13. The IHS of claim 7, wherein the initialization engine is configured to:
allocate the respective processing resources of the NUMA processor to each of the plurality of NUMA nodes.

14. A method for providing fault resilient memory for sub sub-Non-Uniform Memory Access (sub-NUMA), comprising:
determining, by an initialization subsystem, that a Non-Uniform Memory Access (NUMA) processor and a NUMA memory are configured to provide a plurality of NUMA nodes;
allocating, by the initialization subsystem, a respective portion of the NUMA memory to each of the plurality of NUMA nodes; and
configuring, by the initialization subsystem, each respective portion of the NUMA memory to mirror a mirrored subset of that respective portion of the NUMA memory such that respective data that is utilized by each of the plurality of NUMA nodes provided by the NUMA processor and the NUMA memory and that is stored in the mirrored subset of the respective portion of the NUMA memory allocated to that NUMA node is mirrored in that respective portion of the NUMA memory.

15. The method of claim 14, wherein the allocating the respective portion of the NUMA memory to each of the plurality of NUMA nodes includes allocating an equal portion of the NUMA memory to each of the plurality of NUMA nodes.

16. The method of claim 14, wherein the configuring each respective portion of the NUMA memory to mirror the mirrored subset of that respective portion of the NUMA memory includes configuring each respective portion of the NUMA memory to mirror an equal percentage of that respective portion of the NUMA memory.

17. The method of claim 14, wherein the allocating the respective portion of the NUMA memory to each of the plurality of NUMA nodes includes configuring, for each of the plurality of NUMA nodes, at least one System Address Decoder (SAD) register in the NUMA processor to identify a memory address range and one or more memory controllers for use by that NUMA node.

18. The method of claim 14, wherein the configuring each respective portion of the NUMA memory to mirror the mirrored subset of that respective portion of the NUMA memory includes configuring a mirroring subset of that respective portion of the NUMA memory as reserved memory that mirrors data stored in the mirrored subset that is configured as unreserved memory.

19. The method of claim 14, wherein the respective data that is utilized by each of the plurality of NUMA nodes and that is mirrored includes operating system kernel data for that NUMA node.

20. The method of claim 14, further comprising:
allocating, by the initialization subsystem, a respective processing resources of the NUMA processor to each of the plurality of NUMA nodes.

* * * * *

UNITED STATES PATENT AND TRADEMARK OFFICE
CERTIFICATE OF CORRECTION

PATENT NO. : 11,734,176 B2
APPLICATION NO. : 17/512325
DATED : August 22, 2023
INVENTOR(S) : Chao et al.

It is certified that error appears in the above-identified patent and that said Letters Patent is hereby corrected as shown below:

In the Claims

Claim 7, Column 22, Line 24, "an initialization memory" should read --an initialization memory system--

Signed and Sealed this
Seventeenth Day of October, 2023

Katherine Kelly Vidal
*Director of the United States Patent and Trademark Office*